US012568883B2

(12) United States Patent
Peng et al.

(10) Patent No.: US 12,568,883 B2
(45) Date of Patent: Mar. 10, 2026

(54) METHOD AND SYSTEM FOR COMPUTER-ASSISTED HARVESTING

(71) Applicant: FYTO, Inc., Petaluma, CA (US)

(72) Inventors: Valerie Peng, Petaluma, CA (US);
Joseph Adamson, Petaluma, CA (US);
Eric Schneider, Petaluma, CA (US);
Jason Prapas, Petaluma, CA (US)

(73) Assignee: 42FARMS, LLC, Bolinas, CA (US)

( * ) Notice: Subject to any disclaimer, the term of this patent is extended or adjusted under 35 U.S.C. 154(b) by 0 days.

(21) Appl. No.: 18/601,659

(22) Filed: Mar. 11, 2024

(65) Prior Publication Data

US 2024/0298573 A1 Sep. 12, 2024

Related U.S. Application Data

(63) Continuation-in-part of application No. 17/578,972, filed on Jan. 19, 2022, now Pat. No. 12,274,204.

(60) Provisional application No. 63/451,281, filed on Mar. 10, 2023.

(51) Int. Cl.
| | |
|---|---|
| *A01D 44/00* | (2006.01) |
| *A01D 46/30* | (2006.01) |
| *B25J 5/02* | (2006.01) |
| *B25J 9/02* | (2006.01) |

(52) U.S. Cl.
CPC ............. *A01D 44/00* (2013.01); *A01D 46/30* (2013.01); *B25J 5/02* (2013.01); *B25J 9/026* (2013.01)

(58) Field of Classification Search
CPC ...... A01D 44/00; A01D 44/02; A01D 34/008; A01D 34/006; A01D 75/185; G05D 2201/0208; G05D 2105/15; B25J 5/02; B25J 9/1664; B25J 13/089; B25J 15/0616; B60W 2300/158
See application file for complete search history.

(56) References Cited

U.S. PATENT DOCUMENTS

| | | | |
|---|---|---|---|
| 1,571,395 | A | 2/1926 | Clark |
| 2,181,863 | A | 12/1939 | Eddie |
| 2,320,283 | A | 5/1943 | Knowlton et al. |
| 2,629,218 | A | 2/1953 | Smith |
| 2,907,162 | A | 10/1959 | Issaiewitch |
| 2,919,027 | A | 12/1959 | Blumenfeld |
| 2,975,791 | A | 3/1961 | Pansini |

(Continued)

FOREIGN PATENT DOCUMENTS

| | | |
|---|---|---|
| CN | 109336248 A | 2/2019 |
| WO | 2010123943 A1 | 10/2010 |
| WO | 2019171380 A1 | 9/2019 |

*Primary Examiner* — Khoi H Tran
*Assistant Examiner* — Tanner L Cullen
(74) *Attorney, Agent, or Firm* — Dianne E. Reed; VLP Law Group LLP

(57) ABSTRACT

A system for computer-assisted harvesting includes and/or interfaces with: a set of sensors and optionally any or all of: a set of computing and/or processing subsystems (e.g., computers, processors, etc.); a harvesting subsystem (equivalently referred to herein as a harvesting robot); and/or any other components. A method for computer-assisted harvesting can include any or all of: sampling a set of sensors; determining a set of metrics associated with a harvesting region; aggregating the set of metrics; assessing the harvesting region; and triggering an action.

15 Claims, 28 Drawing Sheets
(8 of 28 Drawing Sheet(s) Filed in Color)

(56) References Cited

U.S. PATENT DOCUMENTS

| | | | | |
|---|---|---|---|---|
| 3,238,549 | A | 3/1966 | Burlin et al. | |
| 3,254,355 | A | 6/1966 | Shaw | |
| 3,546,858 | A | 12/1970 | Chaplin | |
| 3,862,537 | A | 1/1975 | Chaplin | |
| 3,878,669 | A | 4/1975 | Chaplin | |
| 3,969,249 | A * | 7/1976 | Dodd | B01D 21/04 |
| | | | | 210/527 |
| 4,222,217 | A | 9/1980 | Brown | |
| 5,235,797 | A | 8/1993 | Sygen et al. | |
| 5,438,794 | A | 8/1995 | Wi | |
| 5,490,920 | A | 2/1996 | Fruchtbaum et al. | |
| 5,585,626 | A | 12/1996 | Beck et al. | |
| 6,398,878 | B1 | 6/2002 | Henkin et al. | |
| 6,910,319 | B2 | 6/2005 | Castleberry | |
| 7,000,372 | B2 | 2/2006 | Kretsch | |
| 7,465,392 | B1 | 12/2008 | Wang | |
| 7,921,595 | B1 | 4/2011 | Monson et al. | |
| 8,479,481 | B2 | 7/2013 | Otoole et al. | |
| 9,200,427 | B2 | 12/2015 | Phillips | |
| 9,894,856 | B2 | 2/2018 | Javan et al. | |
| 10,278,375 | B2 | 5/2019 | Saue | |
| 10,602,663 | B2 | 3/2020 | Szabo | |
| 10,851,511 | B2 | 12/2020 | Shurtleff | |
| 10,925,212 | B2 | 2/2021 | Lapidot et al. | |
| 11,209,824 | B1 * | 12/2021 | Kingman | B60W 30/09 |
| 11,266,068 | B2 | 3/2022 | Prapas et al. | |
| 2006/0150601 | A1 | 7/2006 | Britton | |
| 2013/0095544 | A1 | 4/2013 | Berlowitz et al. | |
| 2013/0309014 | A1 | 11/2013 | Biley et al. | |
| 2014/0231326 | A1 | 8/2014 | Biley et al. | |
| 2014/0353221 | A1 | 12/2014 | Biley et al. | |
| 2017/0268192 | A1 | 9/2017 | Biley et al. | |
| 2019/0216030 | A1 | 7/2019 | Myers et al. | |
| 2019/0274247 | A1 | 9/2019 | Lapidot et al. | |
| 2020/0064144 | A1 * | 2/2020 | Tomita | B62D 6/00 |
| 2020/0100447 | A1 * | 4/2020 | Shoham | A01G 33/00 |
| 2020/0267900 | A1 | 8/2020 | Van Ert | |
| 2020/0333782 | A1 * | 10/2020 | Kent | A01D 93/00 |
| 2021/0161071 | A1 * | 6/2021 | Prapas | A01D 44/00 |
| 2021/0260775 | A1 * | 8/2021 | Mizoguchi | B25J 15/0683 |
| 2021/0345589 | A1 | 11/2021 | Merrill et al. | |
| 2022/0145756 | A1 * | 5/2022 | Vagata | G08G 3/00 |
| 2022/0374026 | A1 * | 11/2022 | Vougioukas | A01D 46/00 |
| 2023/0034365 | A1 | 2/2023 | Nordstrom et al. | |
| 2023/0363360 | A1 * | 11/2023 | Odlin | A01K 61/90 |

* cited by examiner

100

200

Collection assembly

Nozzle

Transport subsystem

Conduit (e.g., gutter)

100

Flotation device

Transport subsystem
(e.g., drivetrain, pulley system, etc.)

100

Optional light source (e.g., to illuminate zone)

Zones of pond

Cart-mounted sensor(s)

Rails for cart travel to zones

Pond

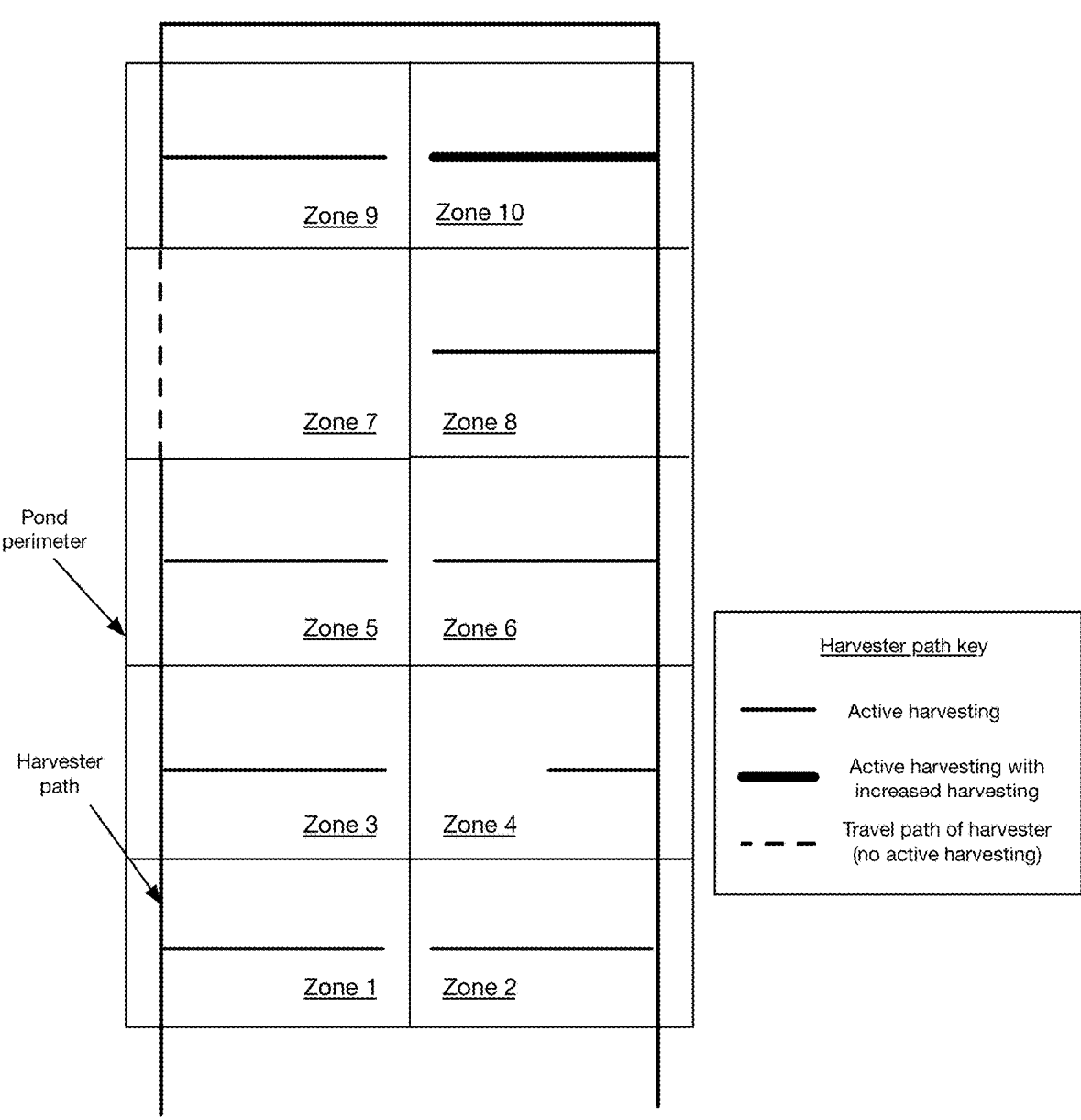

Pond perimeter

Harvester path

Harvester path key

———— Active harvesting

▬▬▬ Active harvesting with increased harvesting

‒ ‒ ‒ Travel path of harvester (no active harvesting)

Zones 1, 2, 3, 5, 6, 8, 9: Harvest with predetermined harvesting parameters
Zone 4: Non-uniform density —> harvest subset with highest density
Zone 7: Density below threshold —> do not harvest
Zone 10: Overgrown —> harvest with slower speeds and/or increased flow rates

FIGURE 12B

Pond
perimeter

Harvester
path

Zone 9    Zone 10

Zone 7    Zone 8

Zone 5    Zone 6

Zone 3    Zone 4

Zone 1    Zone 2

Zones 1, 2, 3, 4, 5, 8, 9, 10: Harvest with predetermined harvesting parameters

Zone 6: Density below threshold --> do not harvest

Zone 7: Overgrown --> increase harvesting path length within zone

Pre-harvest scans

Do not harvest          Do not harvest          Wait to harvest          Harvest now Nozzle Superiorly arranged pump Buoyant (e.g., foam) collar Decreased overlap between superior and inferior portions in response to high internal water levels, which decreases rate of materials entering nozzle Nozzle Superiorly arranged pump Increased overlap between superior and inferior portions in response to low
internal water levels, which increases rate of materials entering nozzle

METHOD AND SYSTEM FOR COMPUTER-ASSISTED HARVESTING

CROSS-REFERENCE TO RELATED APPLICATIONS

This application claims the benefit of U.S. Provisional Application No. 63/451,281, filed 10 Mar. 2023, which is incorporated in its entirety by this reference. This application is a Continuation-in-part Application of U.S. patent application Ser. No. 17/578,972, entitled "SYSTEM AND METHOD FOR AQUATIC PLANT HARVESTING," filed on 19 Jan. 2022, and is herein incorporated by reference in its entirety.

TECHNICAL FIELD

This invention relates generally to the agriculture field, and more specifically to a new and useful system and method for computer-assisted harvesting in the agriculture field.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIGS. 12A-12B depict an example harvesting path through zones of a pond.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
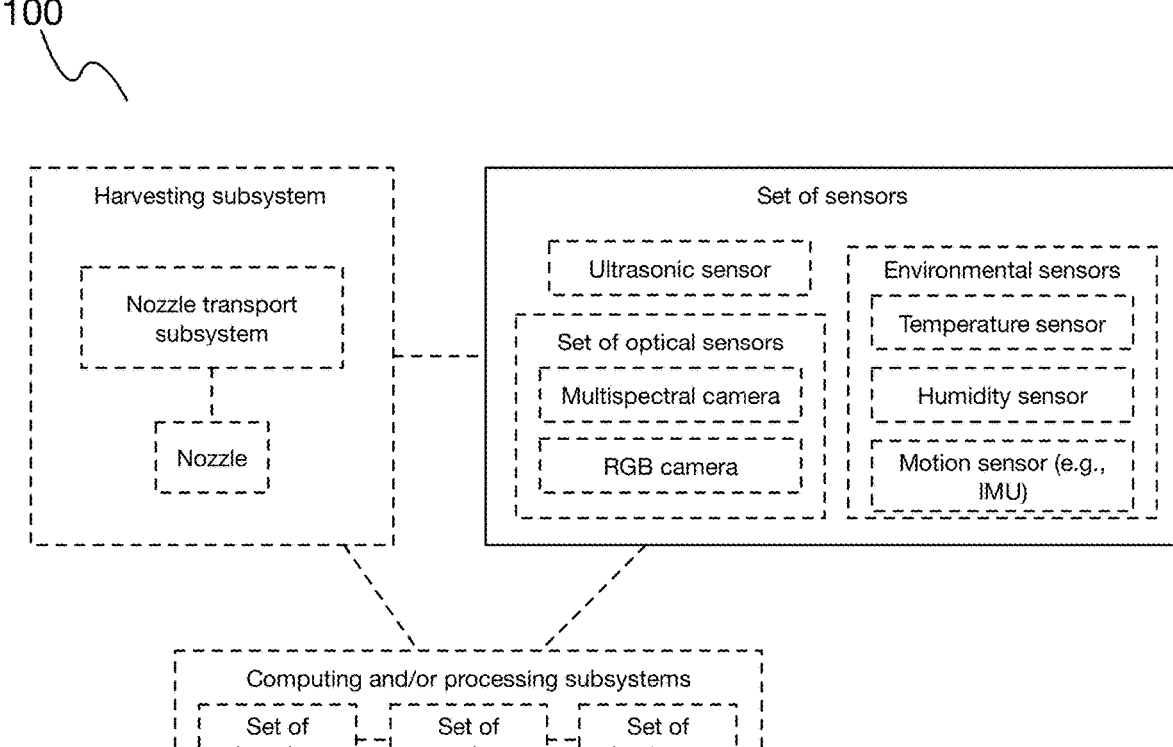
FIG. 1 is a schematic of a system for computer-assisted harvesting.

As shown in FIG. 1, a system 100 for computer-assisted (equivalently referred to herein as computer-aided) harvesting includes and/or interfaces with: a set of sensors. Additionally or alternatively, the system can include and/or interface with any or all of: a set of computing and/or processing subsystems (e.g., computers, processors, etc.); a harvesting subsystem (equivalently referred to herein as a harvesting robot); and/or any other components. Further additionally or alternatively, the system 100 can include and/or interface with any or all of the components as described in U.S. application Ser. No. 17/110,244, filed 2 Dec. 2020, which is incorporated in its entirety by this reference.

Figure 2:
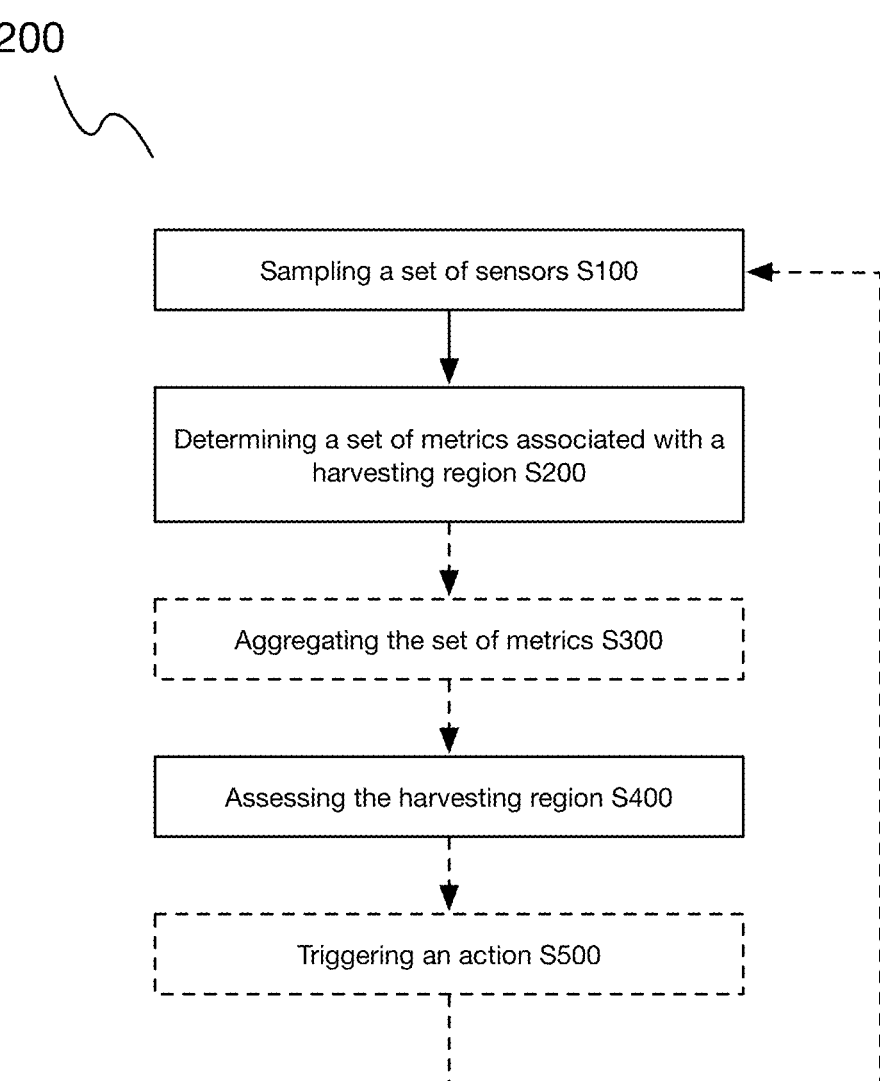
FIG. 2 is a schematic of a method for computer-assisted harvesting.

As shown in FIG. 2, a method 200 for computer-assisted harvesting can include any or all of: sampling a set of sensors S100; determining a set of metrics associated with a harvesting region S200; and assessing the harvesting region S400. Additionally or alternatively, the method 200 can include any or all of: aggregating the set of metrics S300; triggering an action S500; post-processing harvested materials; learning from a prior harvest; and/or any or all of the processes as described in U.S. application Ser. No. 17/110,244, filed 2 Dec. 2020, which is incorporated in its entirety by this reference, or any other suitable processes performed in any suitable order. The method 200 can be performed with a system 100 as described above and/or any other suitable system.

2. Benefits

The system and method for computer-assisted harvesting can confer several benefits over current systems and methods.

In a first set of variants, the technology confers the benefit of optimizing the growing and harvesting conditions associated with aquatic plants, such as floating aquatic plants. This can further confer the benefits of adapting to changing and/or irregular environmental conditions and/or plant behaviors, such as, but not limited to: changes in sunlight and/or lighting (e.g., due to seasonal changes), wind, temperature, humidity, media composition (e.g., plant biomass density, amount of exposed water, coverage density, media nutrients, media pH, media temperature, fertilization, etc.), secondary plant or algae growth, plant health (e.g., chlorophyll content, starch content, protein content, etc.), encroachment by local fauna (e.g., birds, deer, etc.), and/or any other variability in growing conditions of the plants. In a first set of specific examples, the system and/or method dynamically adjust harvesting parameters during a harvesting session of the aquatic plants based on sensor information which is processed and analyzed to assess the plant health. In a second set of specific examples, the set of harvesting parameters are determined prior to a harvesting session.

In a second set of variants, additional or alternative to the first, the technology confers the benefit of utilizing one or more types of sensors to determine a plant coverage metric (e.g., surface ratio, density, biomass density, etc.) associated with aquatic crops, which can be used to optimize the harvesting of the plants and/or any other functions (e.g., inventory management).

In a first set of examples, this is performed with an image sampled by a camera (e.g., RGB camera).

In a second set of examples, non-exclusive with the first, the system and/or method can leverage ultrasonic energy measurements to determine this metric. For instance, in contrast to the way in which ultrasonic transducers are conventionally used, which is for distance and/or level sensing, the system and/or method determine a custom metric based on a set of energy measurement(s) determined with one or more ultrasonic transducers. Additionally or alternatively, the system and/or method can leverage ultrasonic energy measurements for guidance in controlling one or more harvesting components (e.g., harvesting cart, rails supporting harvesting cart, etc.) and/or for any other purposes.

Additionally or alternatively, hyperspectral camera measurements can be utilized.

In a third set of variants, the system and/or method can confer the benefit of overcoming conventional limitations of cameras in assessing a plant density, which can result in the camera reaching signal saturation prior to a density level which is desired to be measured in optimizing harvesting of the plants. In examples, for instance, supplementary sensors (e.g., used downstream of aquatic plant material being harvested from a surface of a vessel) can help rectify a saturated signal that is collected upstream (e.g., from a camera).

In a fourth set of variants, the technology confers the benefit of improving a quality of the aquatic crops, a growth rate of the aquatic crops, and/or a quality of the growing environment. In examples, for instance, a harvesting robot used in harvesting and/or the harvesting process can further be used to monitor and assess the plant health and/or their growth rates over time; detect trends (e.g., particular region experiences low growth due to partial shading) and/or anomalies (e.g., increase in algae growth, presence of a foreign object, etc.); address the detected trends and/or anomalies (e.g., check on/harvest certain regions more than others, remove a foreign object with the harvesting robot, apply a chemical or solution to a particular region, etc.); and/or implement any other processes.

In a fifth set of variants, the technology confers the benefit of continuously learning from iterations of the method (e.g., data collection processes, harvesting processes, post-harvest evaluations, etc.) and implementing these learnings to improve the system and/or method (e.g., at that vessel, at a different/remote vessel, etc.), such as to: update (e.g., retrain) one or more models used in determining harvesting patterns or other parameters; adjusting a harvesting schedule (e.g., to sample data more frequently, to harvest more frequently, etc.); utilize learnings from a first site (e.g., optimal growing conditions, optimal harvesting conditions, etc.) to enhance performance at a remote, second site; and/or perform or alter any other processes.

Additionally or alternatively, any or all of the benefits described above can be applied in variants which do not utilize aquatic plants, such as in agricultural applications in which plants are grown on land (e.g., in soil).

Additionally or alternatively, the system and method can confer any other benefit(s).

3. System

As shown in FIG. 1, a system 100 for computer-assisted harvesting includes and/or interfaces with a set of sensors. Additionally or alternatively, the system can include and/or interface with any or all of: a set of computing and/or processing subsystems (e.g., computers, processors, etc.); a harvesting subsystem; and/or any other components. Further additionally or alternatively, the system 100 can include and/or interface with any or all of the components as described in U.S. application Ser. No. 17/110,244, filed 2 Dec. 2020, which is incorporated in its entirety by this reference.

The system 100 functions to optimize the harvesting of plant material, such as optimizing any or all of: the timing at which harvesting processes are performed, the frequency at which harvesting processes are performed, the duration of a harvesting process, the speed at which plants are harvested (e.g., within a particular location within a harvesting region, overall in the harvesting region, etc.), a minimization in traversals of the pond during harvesting (e.g., having a most efficient [e.g., shortest] path) to minimize resource (e.g., time, power, etc.) expenditure, the volume of plants which are harvested, positions and/or a path of the harvesting (e.g., location(s) of the nozzle), nozzle parameters (e.g., flow rates, flow diameters, etc.) associated with plant collection, the growth and/or growth rate of a crop, and/or any other parameters. Additionally or alternatively, the system 100 can function to perform the harvesting, perform and/or optimize any other processes (e.g., maintaining plant health, preventing plant death, optimizing nutrient addition rates such as in an event that is growth is slowing due to a plant health issue, etc.), and/or can perform any other functions.

In a preferred set of variations, the system 100 is configured for use with aquatic plants, such as floating aquatic plants, examples of which include plants from the Lemnoideae and/or Lemnoceae families, such as any or all of: duckweeds (e.g., common duckweed, *Spirodela polyrhiza*, *Wolffia*, etc.), water lentils, and water lenses. Additionally or alternatively, the aquatic plants can include non-floating and/or rooted aquatic plants, aquatic ferns (e.g., *Azolla* plants, water ferns, water clovers, *Salvinia*, mosquito ferns, etc.), and/or any other suitable aquatic plants.

In additional or alternative variations, the system 100 is configured for use with arable plants (e.g., plants grown in soil), vertically-grown plants, air plants, any other plants, and/or any combination of plants.

3.1 System: Harvesting Subsystem

The system 100 preferably interfaces with and/or is configured to be used in conjunction with a harvesting subsystem, which functions to automatically (e.g., autonomously) and/or semi-automatically (e.g., with human supervision, with human intervention, etc.) harvest plants within a harvesting region (equivalently referred to herein as a vessel). The harvesting subsystem can include one or more harvesting robots, which perform the harvesting and/or associated data collection; infrastructure for transporting the harvesting robot(s) (e.g., tracks, carts, etc.); collection containers (e.g., carts, hoppers, etc.) for collecting harvested material; downstream processing components (e.g., dryers, trays, etc.); and/or any other materials.

In a preferred set of variations, the harvesting subsystem is configured to harvest aquatic plants within an aquatic harvesting region, such as a pond (e.g., man-made pond, natural pond, etc.) or other body of water (e.g., man-made body of water, naturally occurring body of water, etc.).

In an alternative set of variations, the harvesting subsystem is configured to harvest plants (e.g., crops) within a land-based harvesting region, such as arable land (e.g., soil, farmland, etc.). Additionally or alternatively, the harvesting subsystem can be configured to harvest materials in any setting/environment and/or any combination of settings/environments.

Harvesting is preferably implemented in accordance with determining and/or monitoring a plant biomass density.

Additionally or alternatively, this can be implemented in accordance with any other metrics, the plants can be harvested in accordance with any other objectives and/or outcomes, and/or the plants can be otherwise suitably harvested.

Additional or alternative to harvesting, the harvesting subsystem can function to perform any or all of: producing and/or partially producing agricultural products (e.g., animal feed, human food, soil amendment products, livestock feed, etc.); otherwise processing the plant material to produce a plant product; collecting materials (e.g., media, water, debris, etc.) from a pond and/or other growing environment; separating materials (e.g., aquatic plants from water, debris from water, etc.); distributing media to the aquatic environment; preparing agricultural products (e.g., animal feed) from the plants; harvesting a target amount of aquatic plants in a planned harvest time and/or within any other objectives; traversing to access all points of the growth pond; conveying harvested plants to a storage tank; conveying harvested material with minimal damage to the harvested plants and minimum disturbance to the remaining growing plants; returning excess water from the harvest to the pond; performing one or more active dewatering processes (e.g., washing, pressing, draining, heating, drying, etc.); and/or performing any other suitable functions.

The vessel containing the aquatic plants can optionally be divided (e.g., with physical dividers such as walls, floating dividers, etc.) into a set of regions (equivalently referred to herein as zones and/or cells) (e.g., as shown in FIGS. 12A-12B, FIGS. 13A-13B, etc.), where each of these regions can be evaluated and harvested independently. This can enable, for instance, enabling only subsets of cells (e.g., those having a particular plant coverage metric) to be harvested by the harvesting robot at any given time. This can, in turn, help preserve energy and/or resources, optimize harvesting in regions that need it most, and/or otherwise optimize outcomes (e.g., confer operational savings). Additionally or alternatively, the division of the vessel into regions can confer other benefits, such as: minimizing disturbances within and among vessels (e.g., breaking up waves created by wind), enabling interventions (e.g., the addition of chemicals) to be applied only where needed, optimizing an efficiency of robot transit, and/or any other outcomes.

Figure 12A:
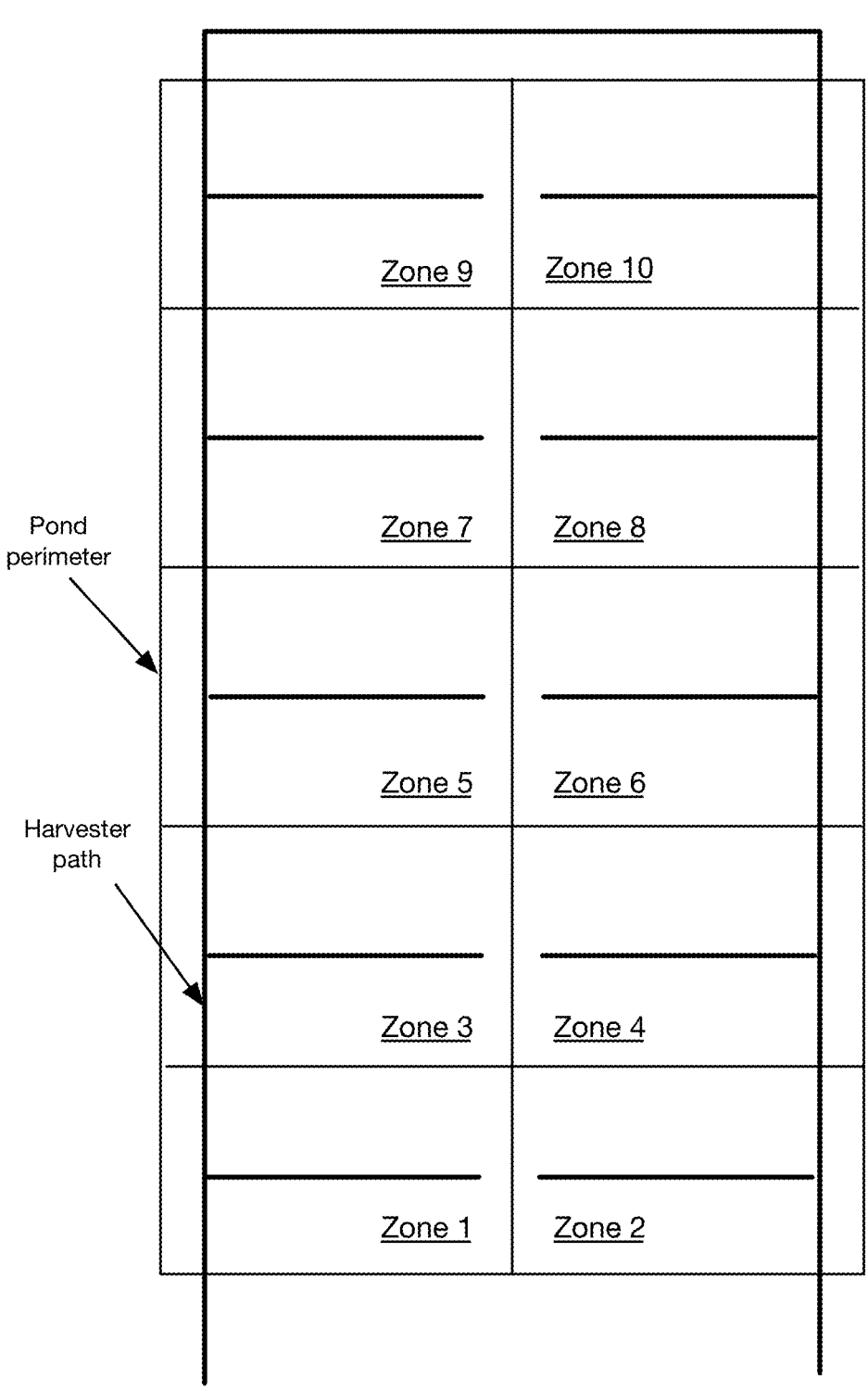

In variants, the vessel can be divided into multiple columns (e.g., 2 as shown in FIG. 12A, between 2-4, between 2-10, greater than 10, etc.) and multiple rows (e.g., 5 as shown in FIG. 12A, between 2-10, between 5-15, between 10-20, greater than 20, etc.). Alternatively, the vessel can have a single row, a single column, a single cell, be non-rectangular (e.g., circular vessel divided into pie-shaped pieces), and/or otherwise suitably divided or not divided. The cells can be uniform in size (e.g., 12 feet×20 feet), different in size, or a combination.

The harvesting subsystem is preferably configured to harvest (e.g., gather, remove from the harvesting region, selectively remove from the harvesting region, etc.) the plants, further preferably in an automated fashion. In a preferred set of variations, such as described in U.S. application Ser. No. 17/110,244, filed 2 Dec. 2020, which is incorporated in its entirety by this reference, the harvesting subsystem includes one or more harvesting robots, each harvesting robot having a nozzle subsystem, the nozzle subsystem including one or more nozzles which function to collect plant material from the harvesting region during a harvesting process. The nozzle can additionally or alternatively perform any other functions associated with capabilities of the harvesting subsystem, such as any or all of the functions described below.

The nozzles are preferably configured to move relative to the vessel, and further preferably in multiple (e.g., 3, 2, etc.) directions (e.g., orthogonal directions, in 3D, etc.). This can be enabled through rails, carts, track subsystems, drones, floating transport subsystems The nozzle assembly is preferably configured to collect plants (e.g., through an inlet, with a vacuum and/or other source of pressure differential, etc.) in accordance with a value and/or range of values of plant to water ratios (e.g., by weight, by mass, by volume, etc.), wherein the water refers to the water solution in a pond (e.g., pure water, water mixed with media and/or debris, etc.). The plant-to-water ratio and/or range of plant to water ratios is preferably between 10% and 50% (e.g., 10%, between 10% and 20%, 20%, between 20% and 30%, 30%, between 30% and 40%, 40%, between 40% and 50%, 50%, etc.), but can additionally or alternatively be less than 10%, greater than 50% (e.g., 60%, between 60% and 70%, 70%, between 70% and 80%, 80%, between 80% and 90%, 90%, between 90% and 100%, 100%, etc.), and/or have any suitable value(s).

The nozzle is preferably configured with a shape, size, and/or other features which optimizes for any or all of: a total amount of plant collected (e.g., within a particular period of time), a plant-to-water ratio (e.g., as described above), a preservation of plant quality (e.g., gentle enough to keep plants intact), an operational efficiency (e.g., prevention/minimization of clogging), and/or any other outcomes.

Figure 6A:
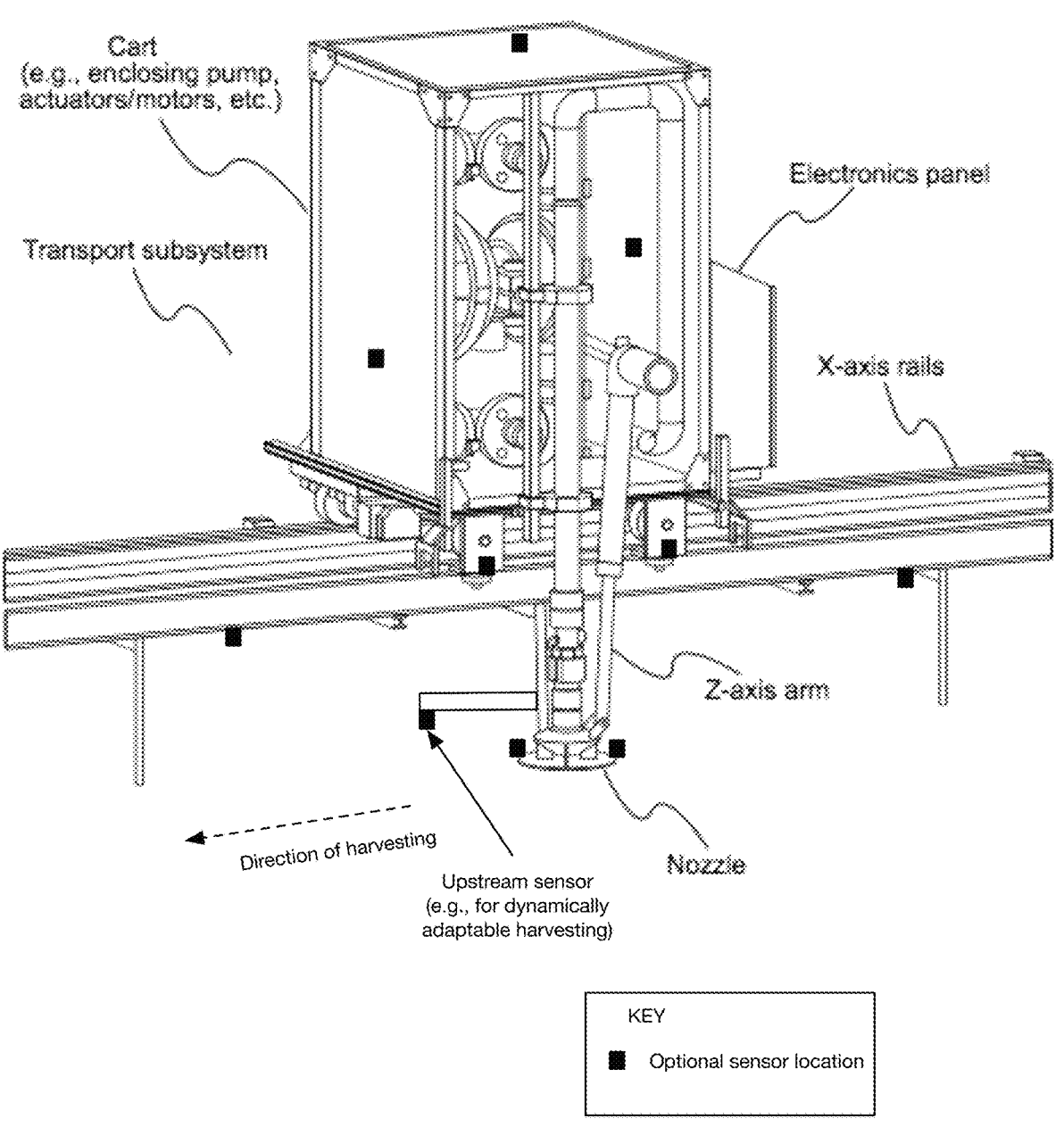
FIGS. 6A-6E depict a first specific example of a harvesting subsystem.
Figure 6B:
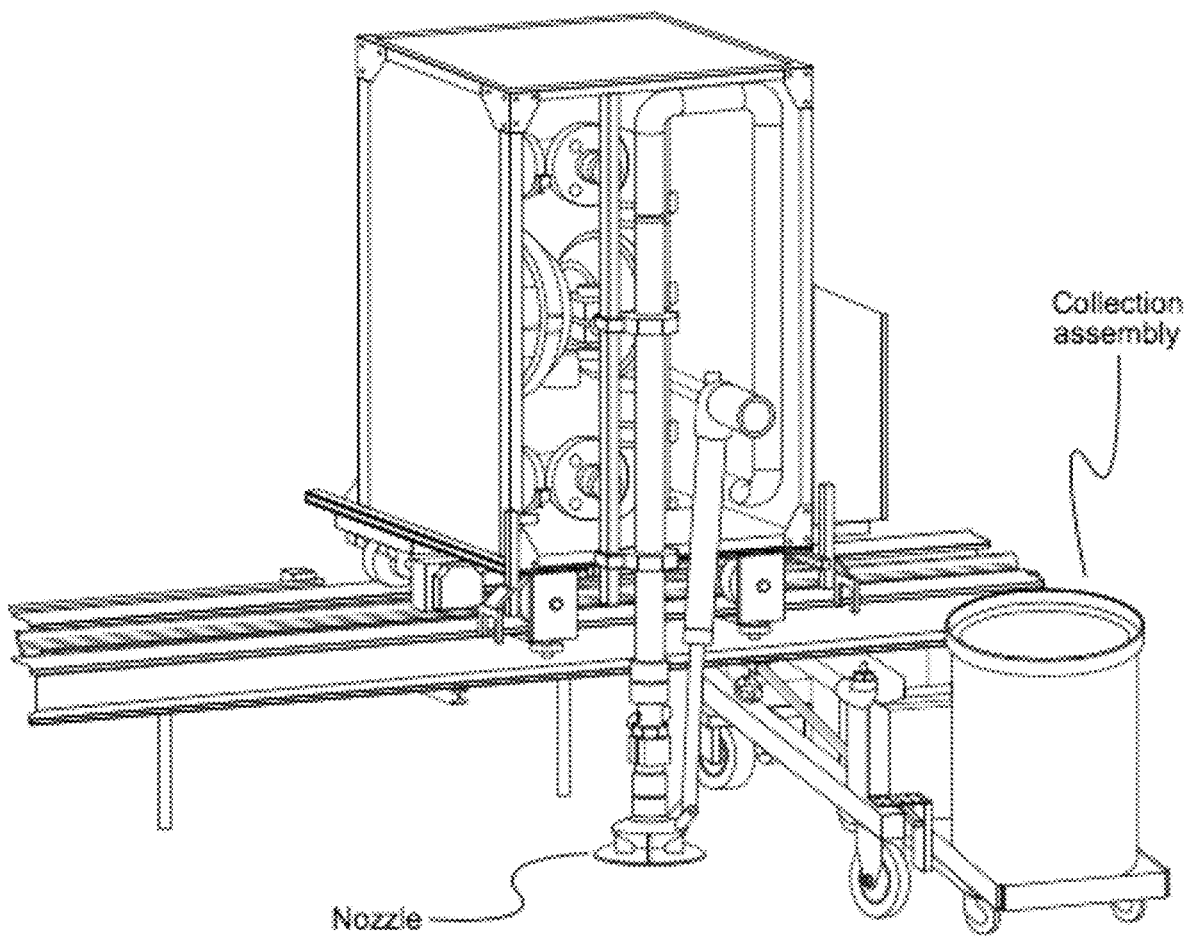
Figure 6C:
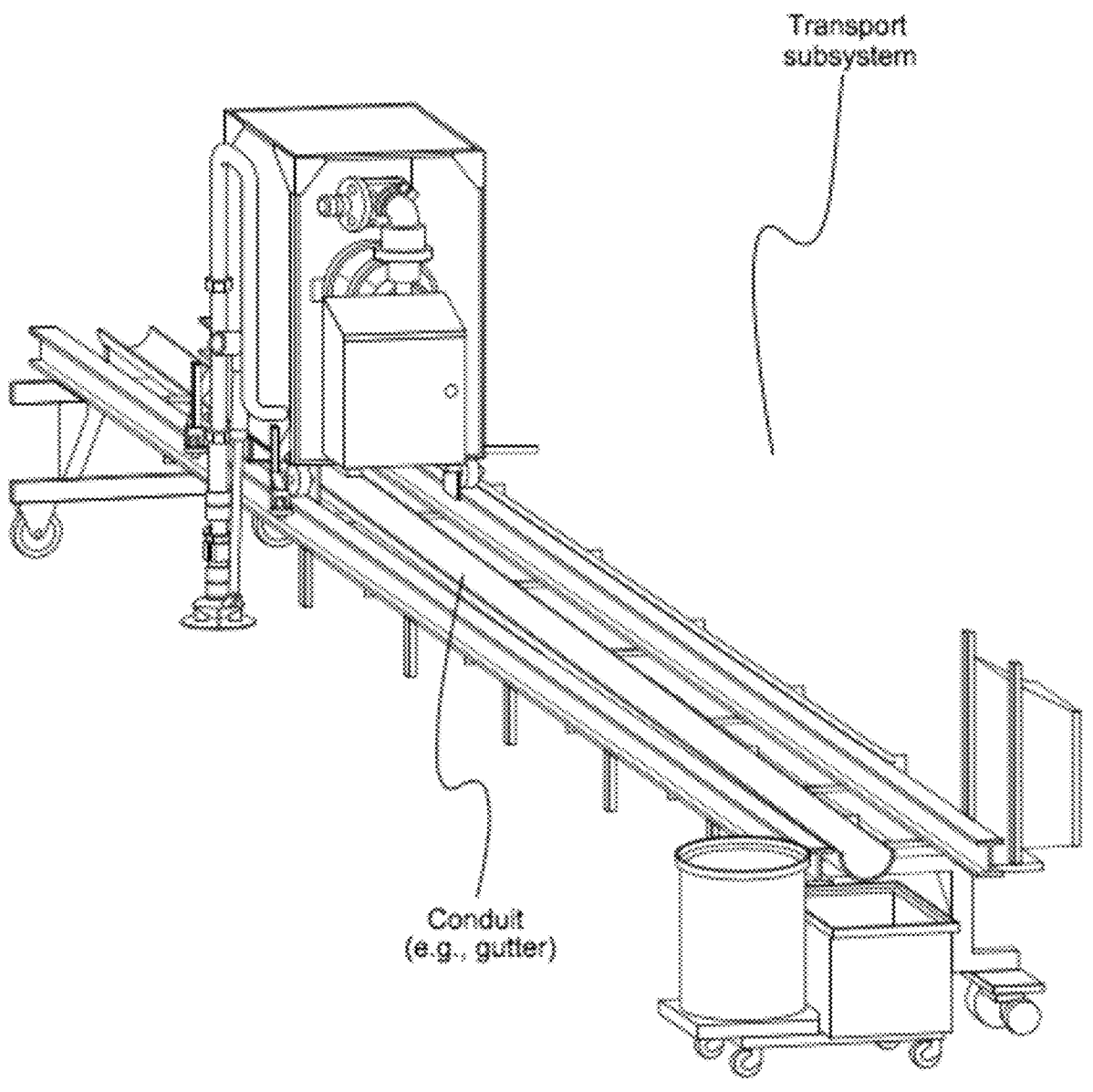
Figure 6D:
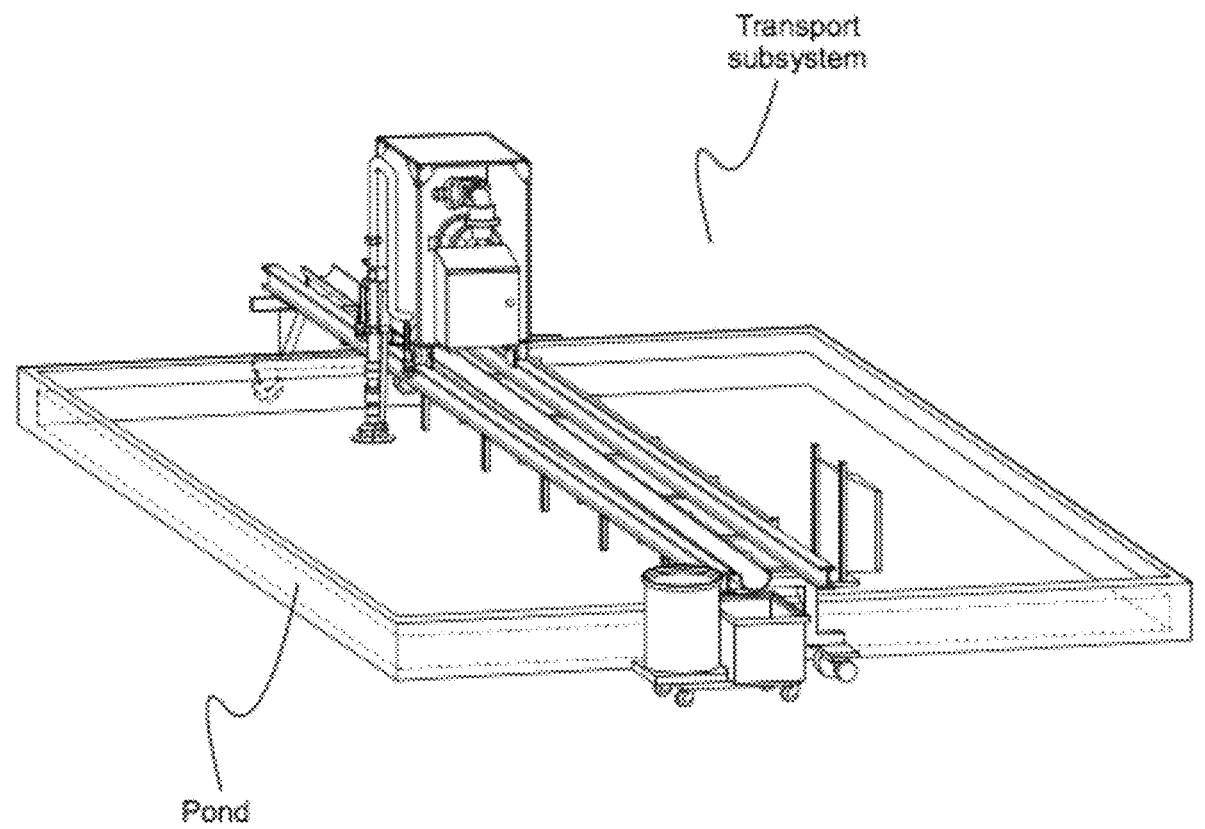
Figure 6E:
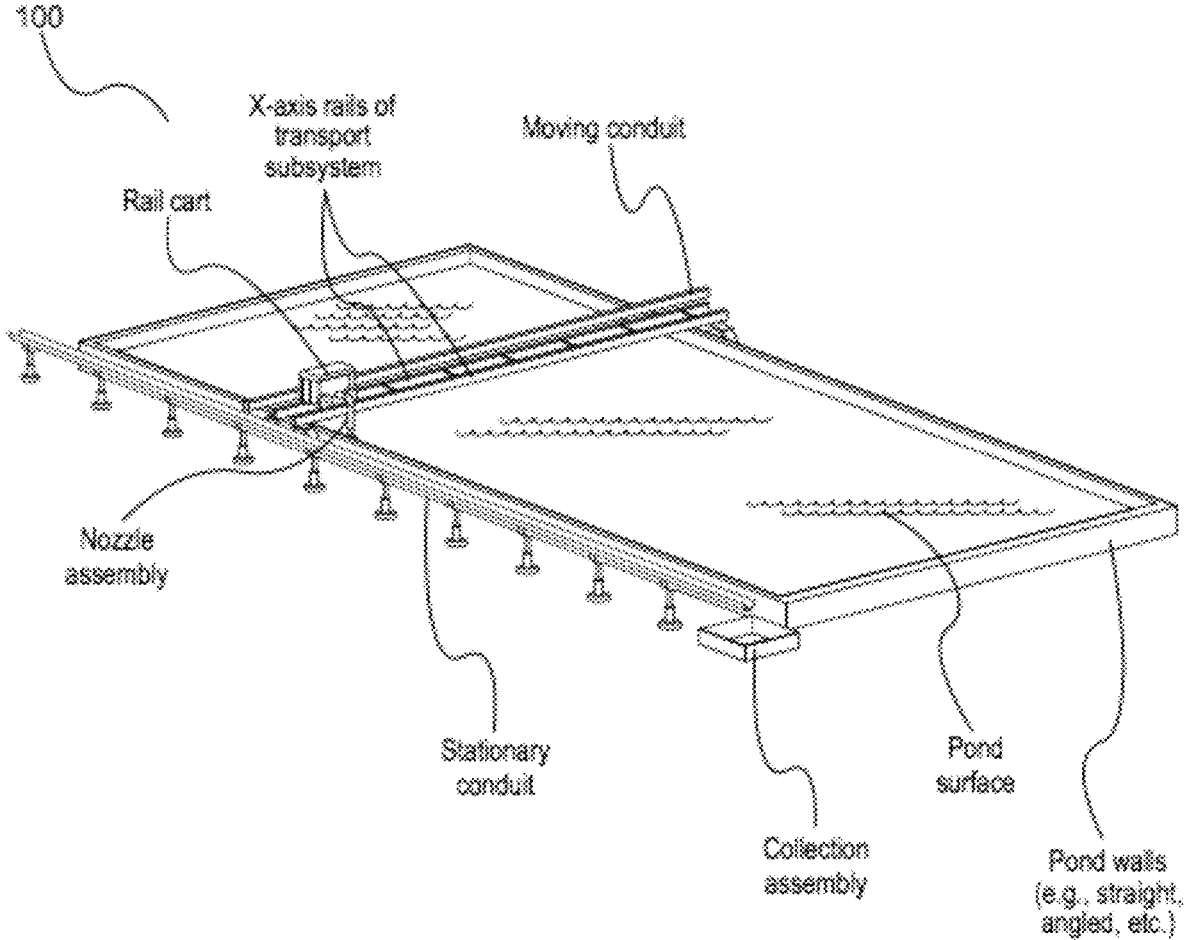

In one set of variants (e.g., as shown in FIG. 6A-6B), the nozzle includes and/or defines a structure (e.g., ramped walls, sloped profile leading toward a central inlet, etc.) configured to guide plants to the inlet of the nozzle. The structure of the nozzle can additionally or alternatively be configured to prevent and/or minimize the introduction of non-plant material to the inlet (e.g., biomass, pond material inferior to floating aquatic plants, etc.), redistribute the remaining plants during harvesting (e.g., does not require additional redistribution steps), and/or can be configured in any other suitable ways.

Figure 9:
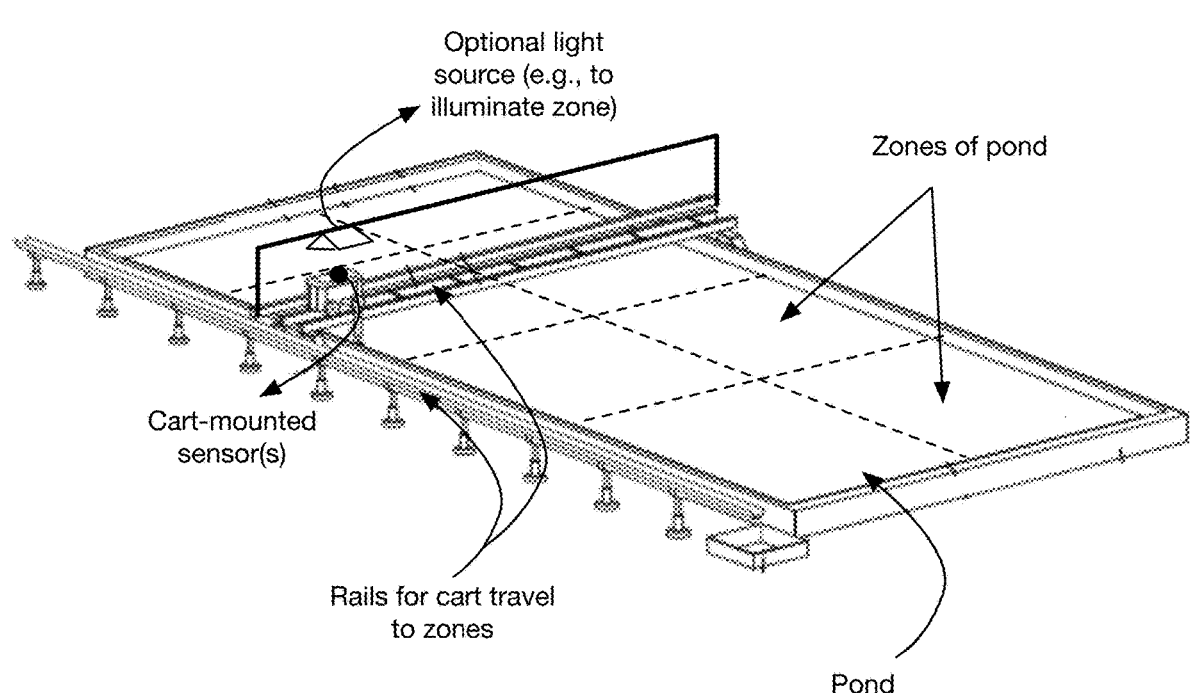
FIG. 9 depicts a variant of a system for computer-assisted harvesting.
Figure 10:
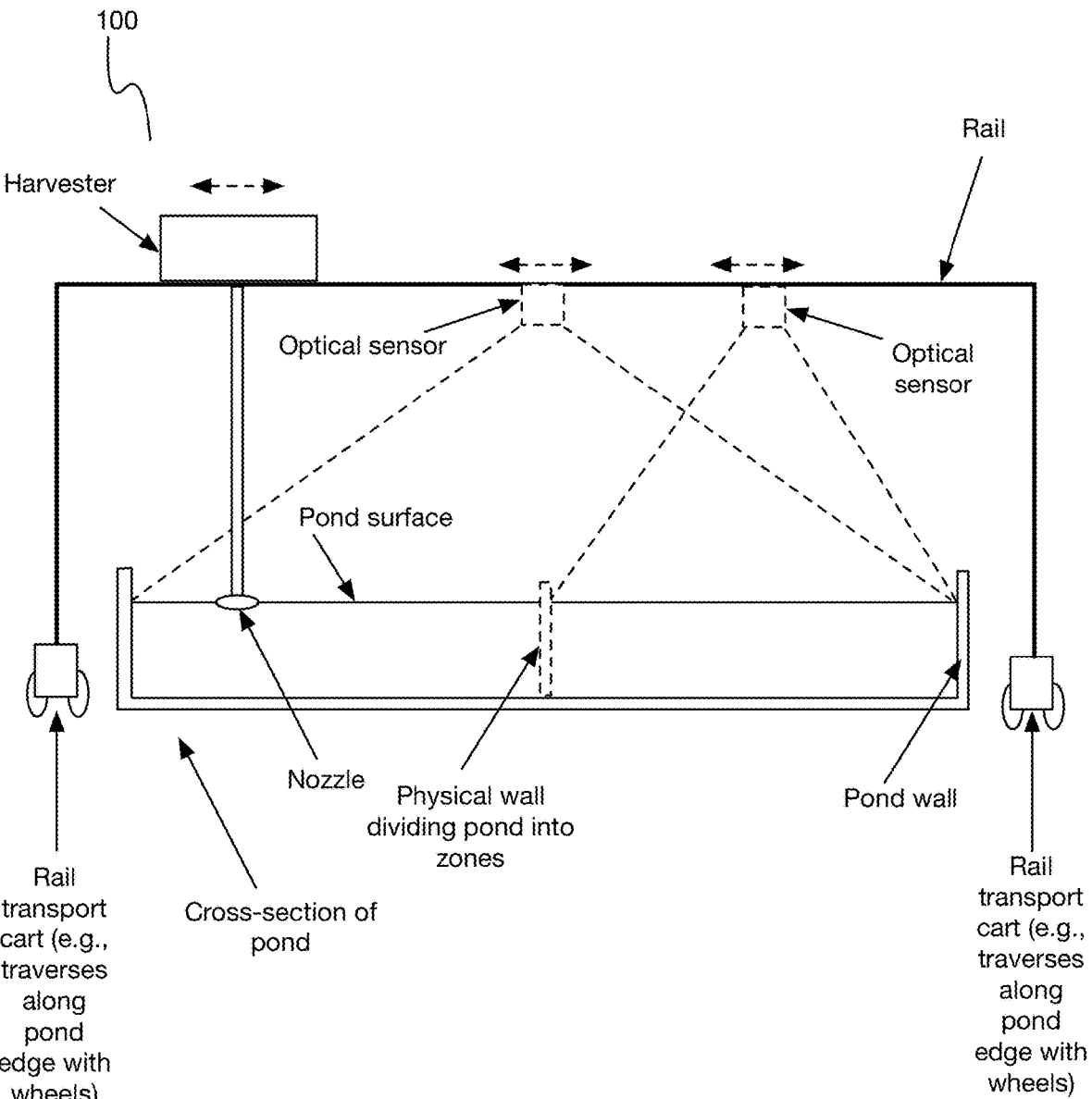
FIG. 10 depicts a variant of sensing in a system for computer-assisted harvesting.
Figure 20A:
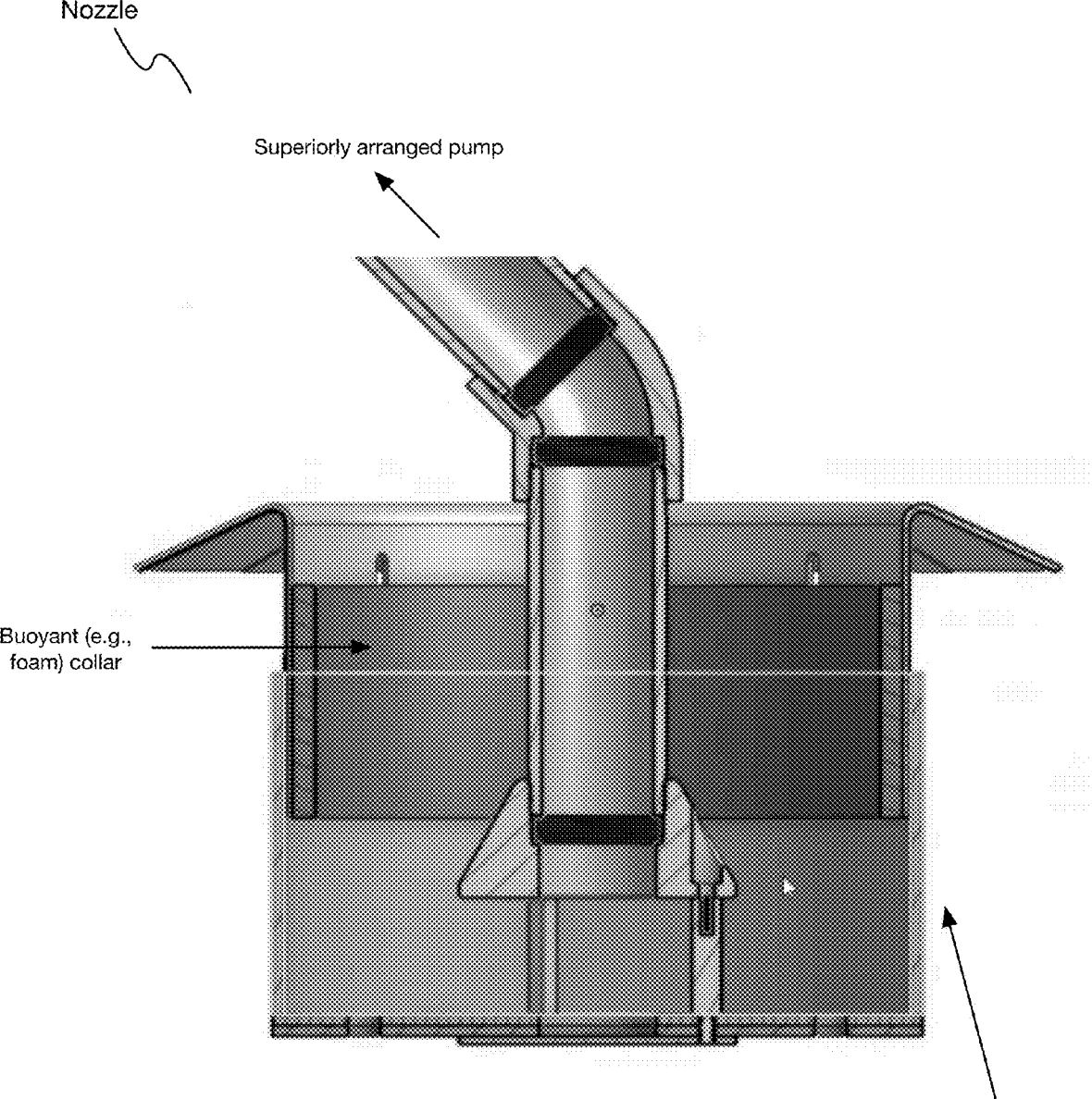
FIGS. 20A-20B depict a variant of a nozzle of the system.
Figure 20B:
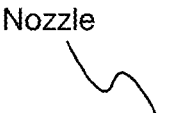

In a second set of variants, the nozzle is configured as a collection container (equivalently referred to herein as a floating bucket nozzle or floating weir nozzle), which functions to dynamically and automatically adapt to changes in height associated with the surface of the aquatic environment relative to the system. In examples, for instance, the harvesting subsystem includes a transport subsystem (e.g., wheeled drivable collection containers as shown in FIG. 10 and/or FIG. 8, rail/track as shown in FIG. 9, etc.) that is arranged on and/or traverses the ground along a length of the aquatic environment, which can be uneven. Because of this, as the harvesting robots travel this length, changes in the height of the aquatic surface relative to the transport subsystem can result in non-optimal collection of the plant material if the height of the collection container is not dynamically adjusted during this traversal. Preferred embodiments of the system and/or the buoyant containers function to enable these dynamic adjustments. In examples (e.g., as shown in FIGS. 20A-20B), for instance, the collection container defines an interior cavity, the interior cavity configured to collect, contain, and/or pass materials collected from the aquatic environment, along with a superior portion (equivalently referred to herein as a floating gate and/or a floating weir) that is movable relative to an inferior portion (equivalently referred to herein as a basin and/or sump), wherein the portions together are collectively configured to collect material proximal to (e.g., within a predetermined range of heights below, within a predetermined range of heights above, etc.) a surface of the aquatic environment.

Additionally or alternatively, the nozzle(s) can be otherwise structured and/or configured.

The harvesting subsystem can include one or more harvesting robots per vessel and/or harvesting subsystem, wherein each harvesting robot includes a nozzle assembly and optionally any or all of: a sensor subsystem (e.g., duplicate sensors for each harvesting robot), a pump, a collection container, and/or any other components. Alternatively, a single harvesting robot can be used for multiple vessels.

Figure 8:
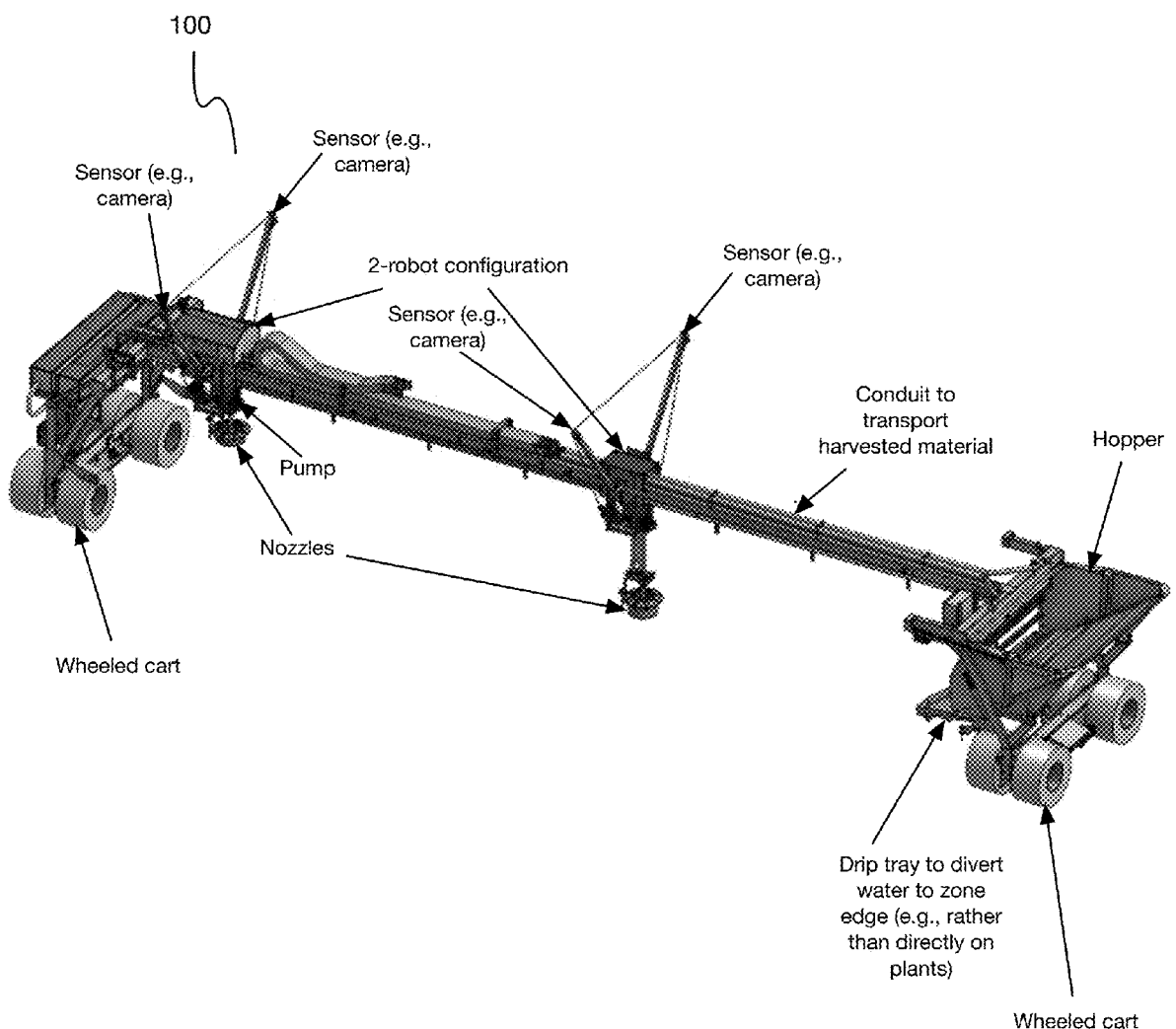
FIG. 8 depicts a variant of a system for computer-assisted harvesting.
Figure 18:
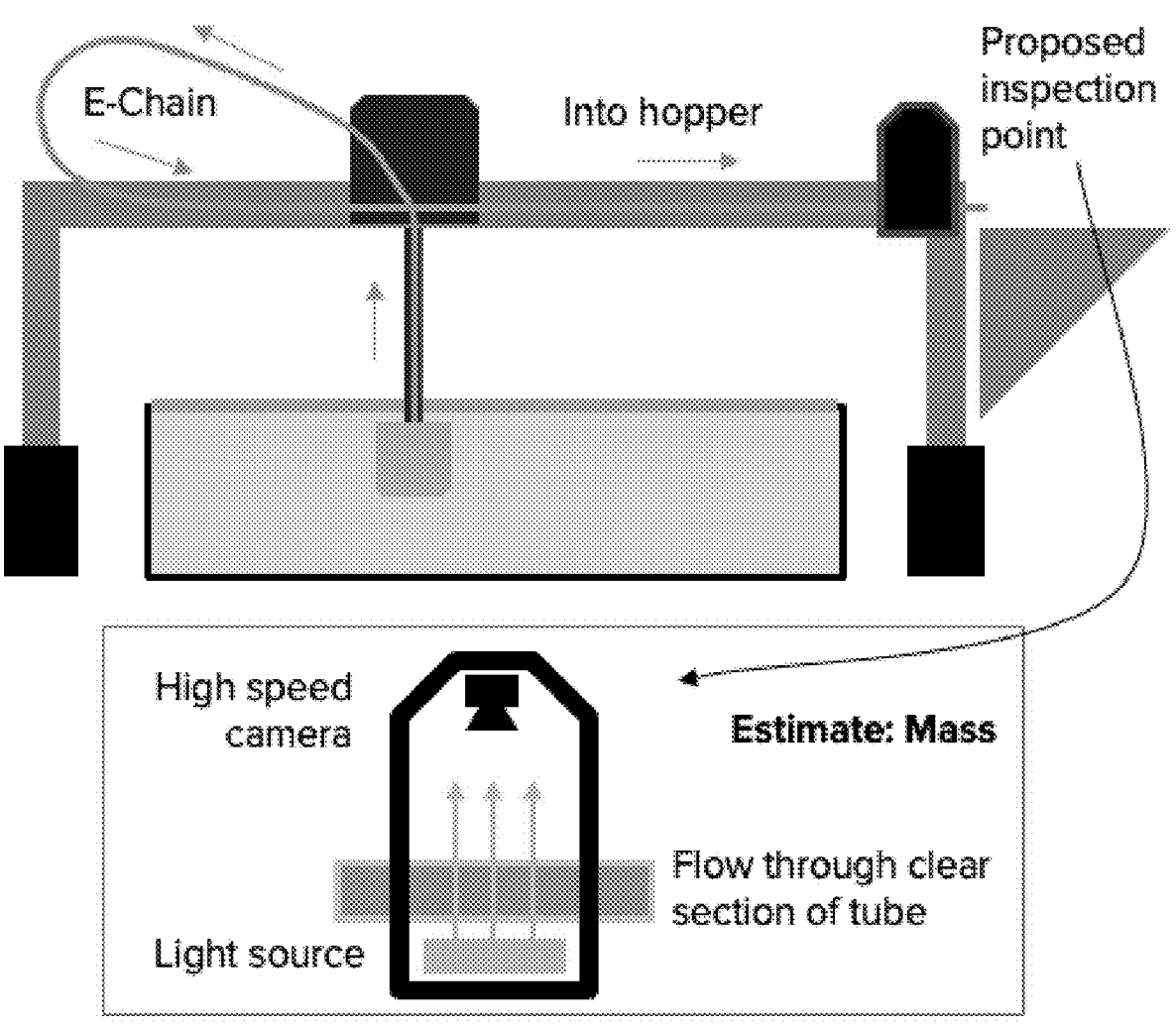
FIG. 18 depicts a variant of a supplementary sensor subsystem.
Figure 19:
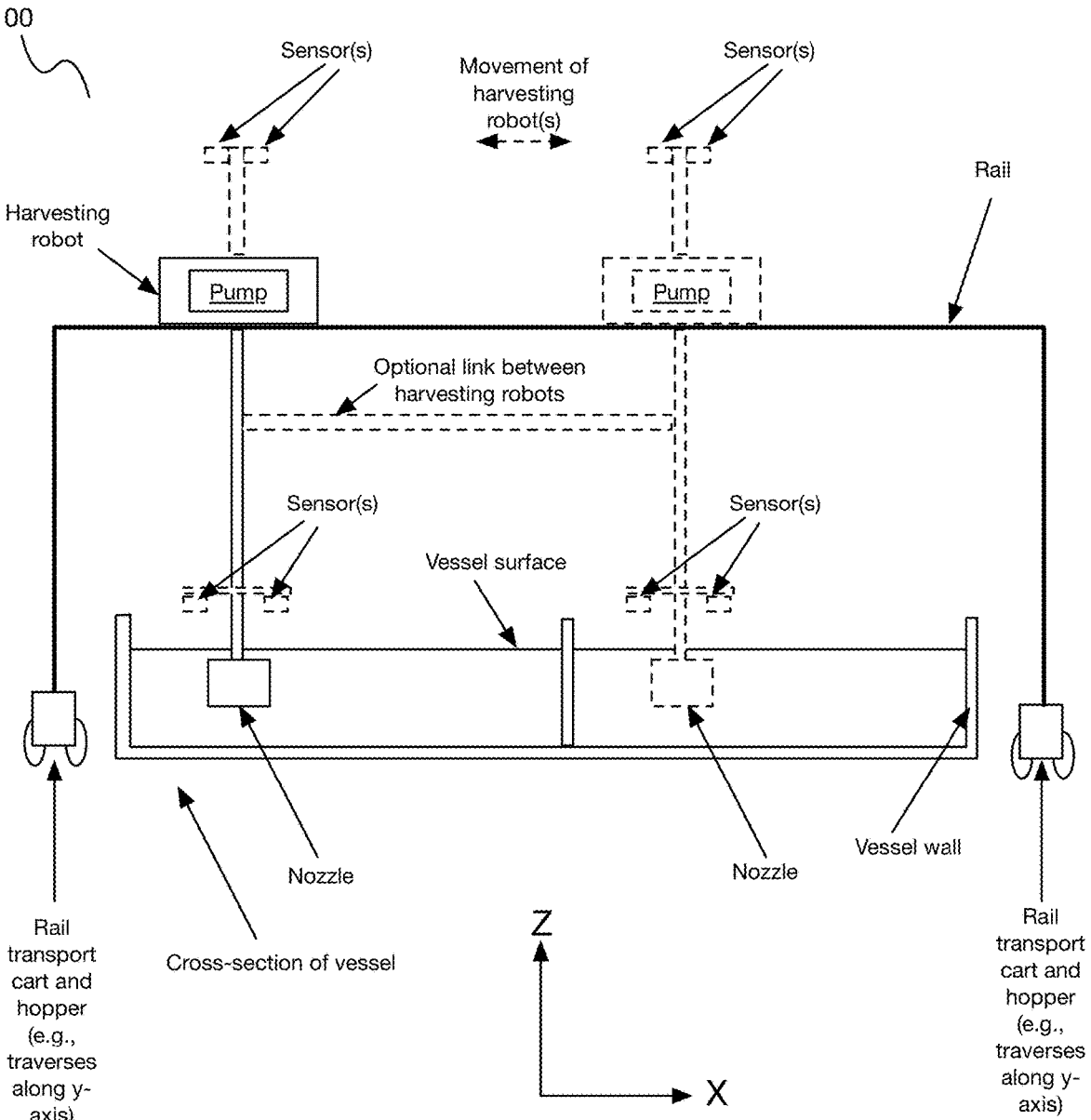
FIG. 19 depicts a variant of the system.

The harvesting subsystem can optionally include multiple (e.g., 2) harvesting robots (e.g., as shown in FIG. 8, FIG. 18, FIG. 19) that can simultaneously collect sensor data (e.g., to evaluate the aquatic crops and their readiness for harvesting), harvest, and/or perform any other functions. Multiple harvesting robots can, for instance, function to: decrease the time it takes to harvest a vessel, optimize usage of the space taken up by a vessel (e.g., by populating multiple robots along a width of the vessel), decrease the power requirements for individual robots, and/or confer any other benefits.

The harvesting robots and/or associated components (e.g., nozzles, sensors, etc.) can: move together, move independently, or any combination (e.g., move independently in a subset of directions). As such, the robots can implement the same data collection and/or harvesting patterns; different data collection and/or harvesting patterns; and/or any combination of patterns.

Figure 17:
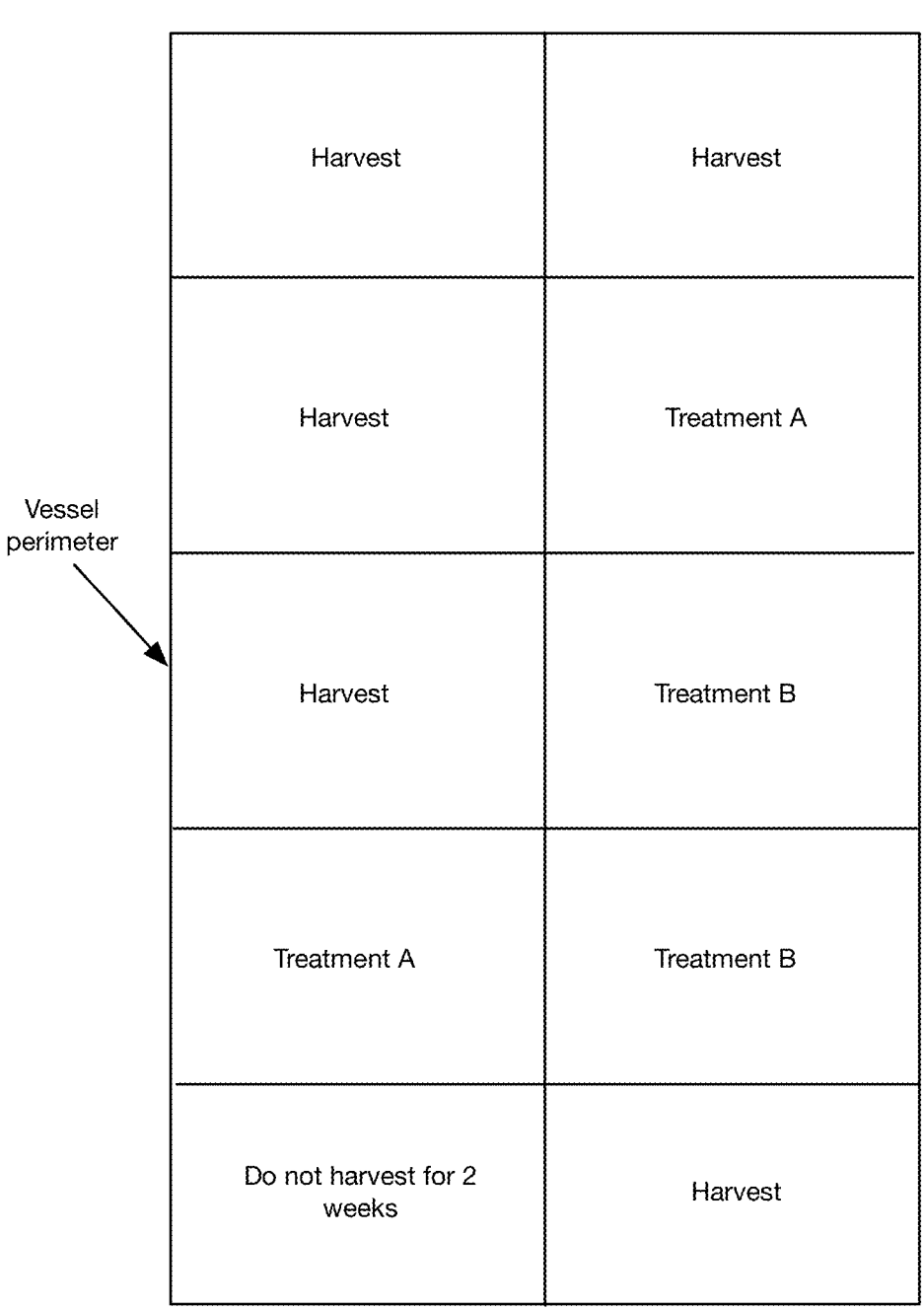
FIG. 17 depicts an example set of actions assigned to zones of a vessel.

In some examples (e.g., as shown as an option in FIG. 19), the harvesting robots can be physically linked together such that they move together in the x-y plane. The nozzles are preferably able to be moved independently in the z-direction, such that one or more nozzles can be actively harvesting (e.g., arranged at or below the surface of the fluid in the vessel) simultaneously with one or more nozzles that are not harvesting (e.g., arranged at a height above the surface of the vessel). This can enable cells in adjacent columns of the vessel, for instance, to be harvested differently (e.g., as shown in FIG. 17). Additionally or alternatively, the nozzles can simultaneously implement the same harvesting patterns, different harvesting patterns (e.g., through independent movement in the x-direction, y-direction, and/or x-y plane), and/or otherwise suitably configured.

In a particular example, the harvesting subsystem is equipped with as many nozzles as there are columns in the vessel.

In another example, a single nozzle harvests an entire vessel.

In yet another example, multiple nozzles can simultaneously harvest a cell at any given time.

The harvesting subsystem preferably includes one or more pumps (e.g., 1 per nozzle, 1 per harvesting subsystem, etc.), which function to draw the plant material into and through the nozzle (e.g., into a collection container such as a hopper, etc.). The pumps can be direct current (DC) controlled pumps, alternating current (AC) controlled pumps, other pumps, or a combination of pumps. In some variants, the system includes DC-controlled, flexible impeller pumps.

The harvesting subsystem can optionally include and/or interface with one or more transport subsystems, which function to enable movement (e.g., automated movement according to a set of control commands) of the nozzle assembly and/or other components (e.g., pump assembly which controls a flow rate of materials through the nozzle) around the harvesting region (e.g., pond surface). Additionally or alternatively, the transport subsystem can function to support height changes of the nozzle, enable movement of sensor subsystems (e.g., as described above), enable movement of system components among multiple ponds, and/or perform any other suitable functions. The transport subsystem preferably enables automated and/or partially automated movement of the nozzle relative to the harvesting region (e.g., through a control and/or drive subsystem implementing a set of programmed control commands, through dynamically determined control commands, etc.), but can additionally or alternatively perform any other functions.

In a first set of variants, the transport subsystem includes a set of carts (e.g., independently wheeled carts, carts moving along a groove or guide or rail, drivable/actuatable carts, etc.) that transport a rail along a length of the pond (e.g., while freely driving on the ground), where the harvesting robot can move along the rail to traverse a width of the pond.

In a second set of variants, the transport subsystem includes a rail subsystem, which enables movement of the nozzle assembly along a surface of the harvesting region (e.g., along an X-Y plane of a pond). In preferred examples of the second set of variants (e.g., as shown in FIGS. 6A-6E), the rail subsystem includes a set of rails along which the nozzle moves, wherein the set of rails is configured to move in a direction perpendicular to the length of the set of rails, such that the nozzle can move along a plane defined by these perpendicular directions. In alternative examples, the rail subsystem can rotate around a central axis (e.g., through coupling to a drivable cart), thereby enabling the nozzle to traverse the surface of a circular harvesting region.

Additionally or alternatively, one or more nozzles and/or nozzle assemblies can be stationary relative to the set of rails. In some variants, for instance, the nozzle assembly includes multiple nozzles (e.g., 2, 4, 8, 10, between 2 and 8, more than 10, etc.), wherein the multiple nozzles are fixed to the rail, wherein movement of the rail transports the nozzles along the surface of the pond.

Further additionally or alternatively, a nozzle assembly (e.g., and associating cart) can move with trackless wheels and/or a tension cable as motion guidance rather than and/or in addition to moving along the tracks of one or more rails.

Figure 7:
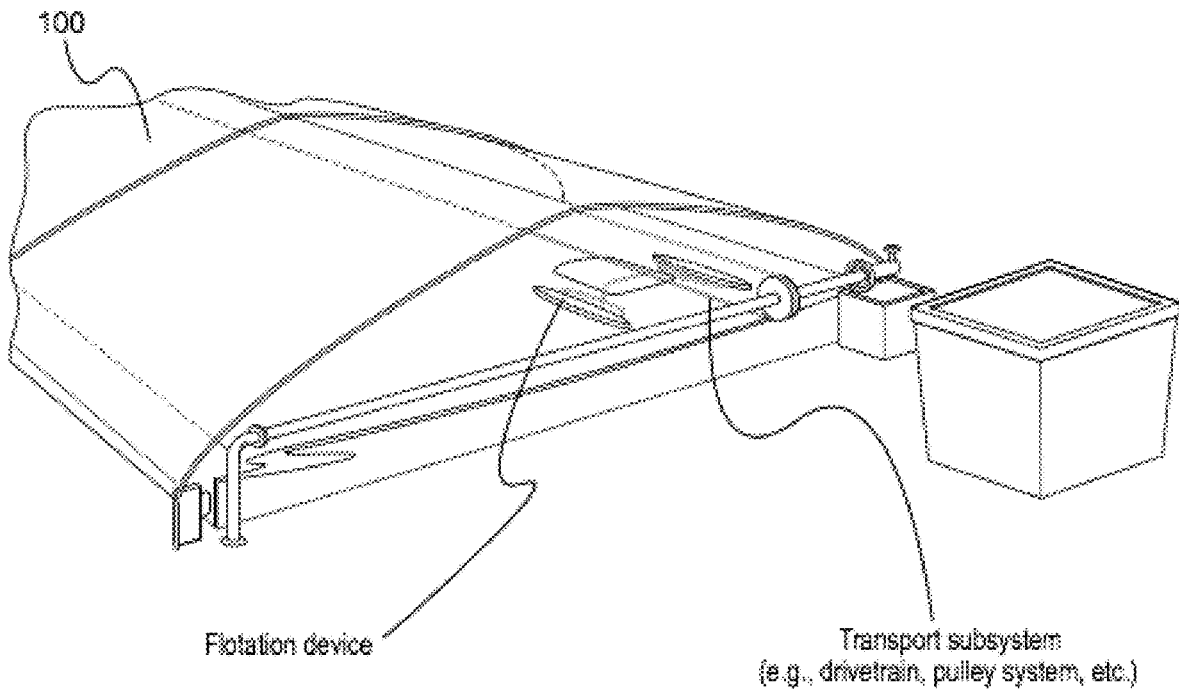
FIG. 7 depicts a second specific example of a harvesting subsystem.

In a second set of variants (e.g., as shown in FIG. 7), the transport subsystem can include a flotation-based transport subsystem (e.g., set of floating weirs) configured to transport the nozzles.

In a third set of variations, the transport subsystem can travel over the surface of the pond (and/or at or below the surface of the pond) through aerial movement, such as with a drone-based harvesting subsystem.

Additionally or alternatively, the harvesting subsystem can include another transport subsystem, a combination of transport subsystems, be absent of a transport subsystem, and/or be otherwise configured.

The harvesting subsystem can additionally or alternatively include any other components and/or combination of components, such as a control and/or drive subsystem (e.g., to move other components of the system, to operate pumps, etc.) and/or any or all of those described in U.S. application Ser. No. 17/110,244, filed 2 Dec. 2020, which is incorporated in its entirety by this reference.

3.2 System: Set of Sensors

The system 100 preferably includes a set of sensors, which function to collect information with which to optimize a harvesting (e.g., automated harvesting) process and/or any other processes associated with monitoring, maintaining, growing, and/or processing plant material. Additionally or alternatively, the set of sensors can be used for any or all of: detecting that a foreign object has entered and/or stayed within the harvesting region, detecting the health of the plants, detecting that maintenance of the plants and/or the harvesting region (e.g., media levels and/or media composition) is required, detecting the composition of the plants (e.g., protein content, chlorophyll content, starch content, lipid content, etc.), and/or can perform any other functions.

The set of sensors can be coupled to the harvesting subsystem (e.g., moving with a nozzle and/or harvesting robot), freely moving relative to any or all of the harvesting subsystem, stationary (e.g., relative to the vessel), and/or otherwise suitably arranged.

The set of sensors preferably includes a set of optical sensors (e.g., cameras, multispectral sensors, etc.), which are preferably used to determine a coverage metric (e.g., density, plant mass, etc.) associated with the aquatic plants that can be used in informing and/or triggering any or all of the processes in S500. Additionally or alternatively, the optical sensors can be used for any or all of: detecting whether or not the aquatic plants have reached a visual saturation level (e.g., minimum surface area coverage, to trigger ultrasonic sensor measurements, etc.), detecting plant health information (e.g., detect chlorophyll content with multispectral imaging), detecting whether or not a foreign object has entered the harvesting region (and optionally what kind of object it is) (e.g., detecting that a region has been dark and/or is an irregular color, detecting an irregular shape within the harvesting region, etc.), detect features associated with a composition of the harvesting region (e.g., ratio of floating aquatic plants to algae), and/or performing any other functions. In a set of examples, for instance, detecting any or all of plant coverage, exposed water, and/or foreign objects is performed with one or more cameras (e.g., along with computer vision processes) while determining a health of the plants (e.g., chlorophyll content) is performed with other multispectral photo-sensors.

The set of optical sensors can include, but is not limited to: visible imaging (e.g., RGB) cameras, multispectral cameras, hyperspectral cameras, near infrared (NIR) cameras, photometers, photodiodes, phototransistors, spectroscopy devices, and/or any other cameras. In preferred variants (e.g., as shown in FIG. 8), for instance, the set of optical sensors includes one or more of: a multispectral camera (e.g., to detect chlorophyll content, to detect plant density, etc.), an RGB camera (e.g., to detect plant density), any other cameras, and/or any combination of optical sensors.

In some variants, one or more sensors, such as cameras, are arranged superior to the harvesting robot(s), and optionally angled (e.g., as shown in FIG. 8), which can function to: enable data collection to be performed immediately prior to harvesting (e.g., if the camera is upstream of the nozzle during travel); enable a post-harvest image to be collected (e.g., if the camera is downstream of the nozzle during travel); and/or otherwise suitably function. Additionally or alternatively, the cameras or other sensors can be arranged inferior to the rails such as at a platform above the nozzle and/or coupled to the nozzle.

Additionally or alternatively, any or all sensors can be offboard the harvesting robot, stationary, and/or any combination of sensors can be used.

In other variants (e.g., as shown in FIG. 9), the system includes one or more cart-mounted optical sensors.

In yet another set of variants (e.g., as shown in FIG. 10), the system includes one or more optical sensors that are mounted to (e.g., movably mounted, statically mounted, etc.) one or more rails (equivalently referred to herein as a chassis) of the system. In some examples, for instance, the system includes one or more optical sensors that can optionally move along the rail (e.g., to image an entire width of a pond). Additionally or alternatively, in examples including multiple optical sensors, the optical sensors can be selectively and/or dynamically activated (e.g., to image a zone ahead of the harvester).

Figure 11:
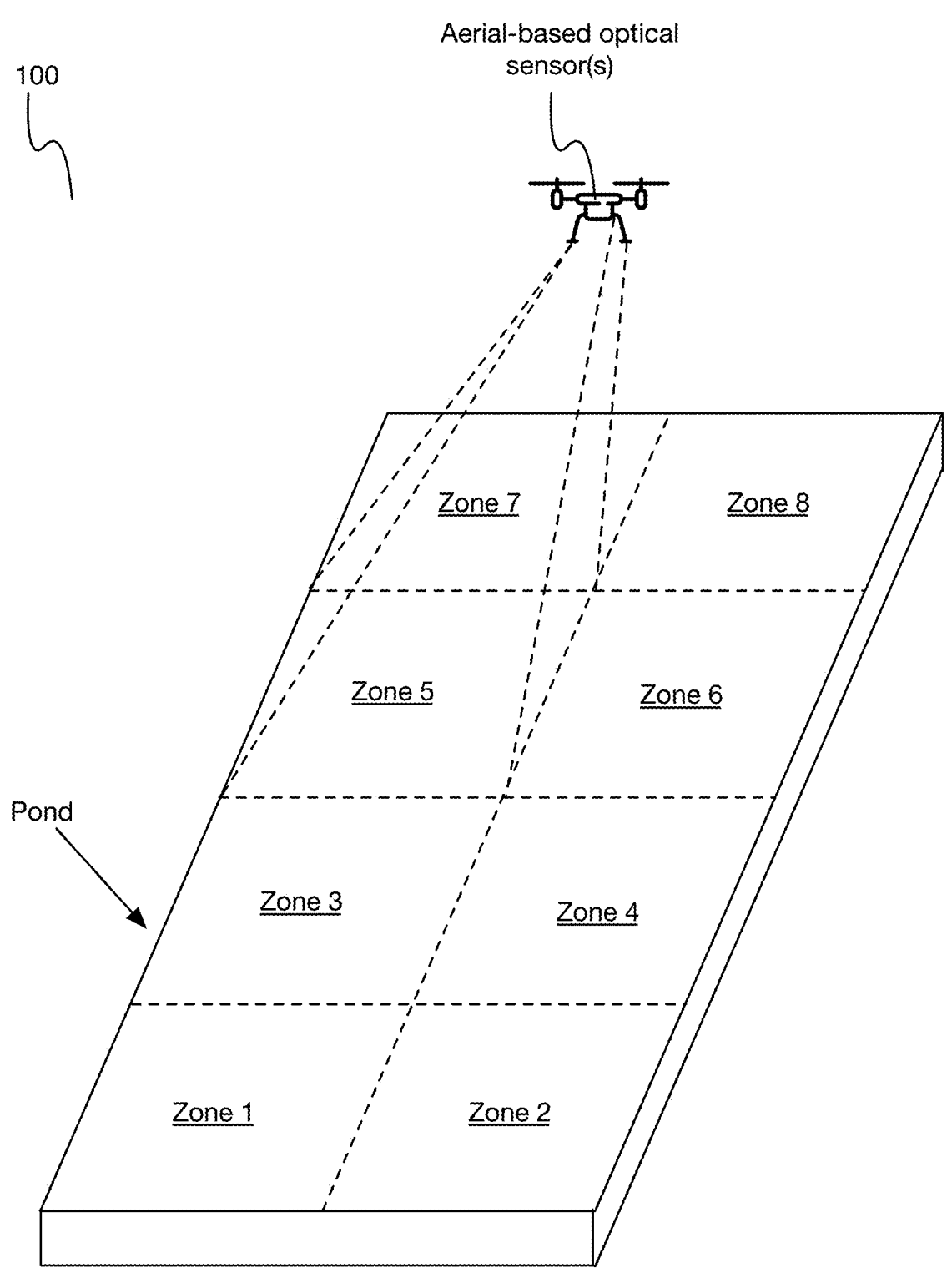
FIG. 11 depicts a variant of sensing in a system for computer-assisted harvesting.

In yet another set of variants (e.g., as shown in FIG. 11), the system includes one or more optical sensors onboard an unmanned aerial vehicle (e.g., drone), wherein the optical sensors can image a surface of the pond before and/or during a harvesting of the pond, and/or after or outside of a harvesting session.

The system can further include one or more light sources (e.g., mobile light sources, stationary light sources, excitation source/signal, as shown in FIG. 9, etc.), which function to optimize data collection associated with any or all of the optical sensors.

The set of sensors can optionally include a set of one or more radio telemetry sensors, ultrasonic sensors (e.g., ultrasonic transducer, ultrasonic transmitter, ultrasonic receiver, ultrasonic transceiver, etc.), infrared (IR) sensors, and/or any other sensors. These sensors can, for instance, be optionally be used (e.g., with optical sensors) to determine a density (e.g., mass density, biomass density, etc.) of the plants within the harvesting region (e.g., as described below). This can be used to assess a composition of the pond (e.g., how much plant mass has grown relative to the volume of liquid in the aquatic harvesting region, how much plant mass has grown over a certain area, etc.), which informs whether or not (and/or when, how frequently, etc.) the harvesting region is ready to be harvested.

Utilizing ultrasonic sensors can confer benefits over other tools for determining plant density, such as being non-destructive and non-interfering. This can be particularly beneficial in embodiments involving the harvesting of aquatic plants, as physical manipulation of the plants can harm or destroy the plants (e.g., such as in events involving aquatic plants which cannot reorient themselves if disturbed). Additionally or alternatively, the ultrasonic sensors can be used in other ways (e.g., to adjust nozzle height, to safely operate mobile components such as transport subsystem components of the system, etc.), confer other benefits (e.g., be unaffected by ambient light and/or the time of day of the sensor measurements and/or harvesting), and/or the density of the plants can be determined with sensors other than ultrasonic sensors.

In some variations, the ultrasonic sensors are further used to detect their height above the harvesting region surface (e.g., pond surface), which can be used to normalize, calibrate, and/or adjust any or all of the sensor measurements and/or metrics (e.g., described below) to account for an uneven harvesting region surface. Alternatively, optical sensors or other sensor types can be used for such a purpose.

The ultrasonic sensors can be operated with any suitable frequency or frequencies (e.g., between 30 and 50 kHz, between 40 and 45 kHz, between 41-42 kHz, less than 30 kHz, greater than 50 kHz, etc.). Additionally or alternatively, the system can include (and/or replace any or all of the ultrasonic sensors) with infrasound sensors, acoustic sensors, echolocation sensors, and/or any other sensors operated with any suitable range of frequencies.

In a first set of variations, multiple ultrasonic transducers are utilized, which can function to compensate for differing angles of attack (e.g., as measured by an inertial measurement unit [IMU]). In specific examples, for instance, two or more ultrasonic transducers are pointed at offset angles and their measurements averaged to reduce sensitivity of the system to variations in the platform angle.

Additionally or alternatively, a linear model and/or or mechanical stabilization can be used (e.g., as a motorized gimbal) to compensate for structure flexion and/or land grade variations as measured by an IMU. Further additionally or alternatively, passive features to reduce angle sensitivity such as parabolic or otherwise shaped housings can be used for sensors to account for their angle of attack.

Figure 16:
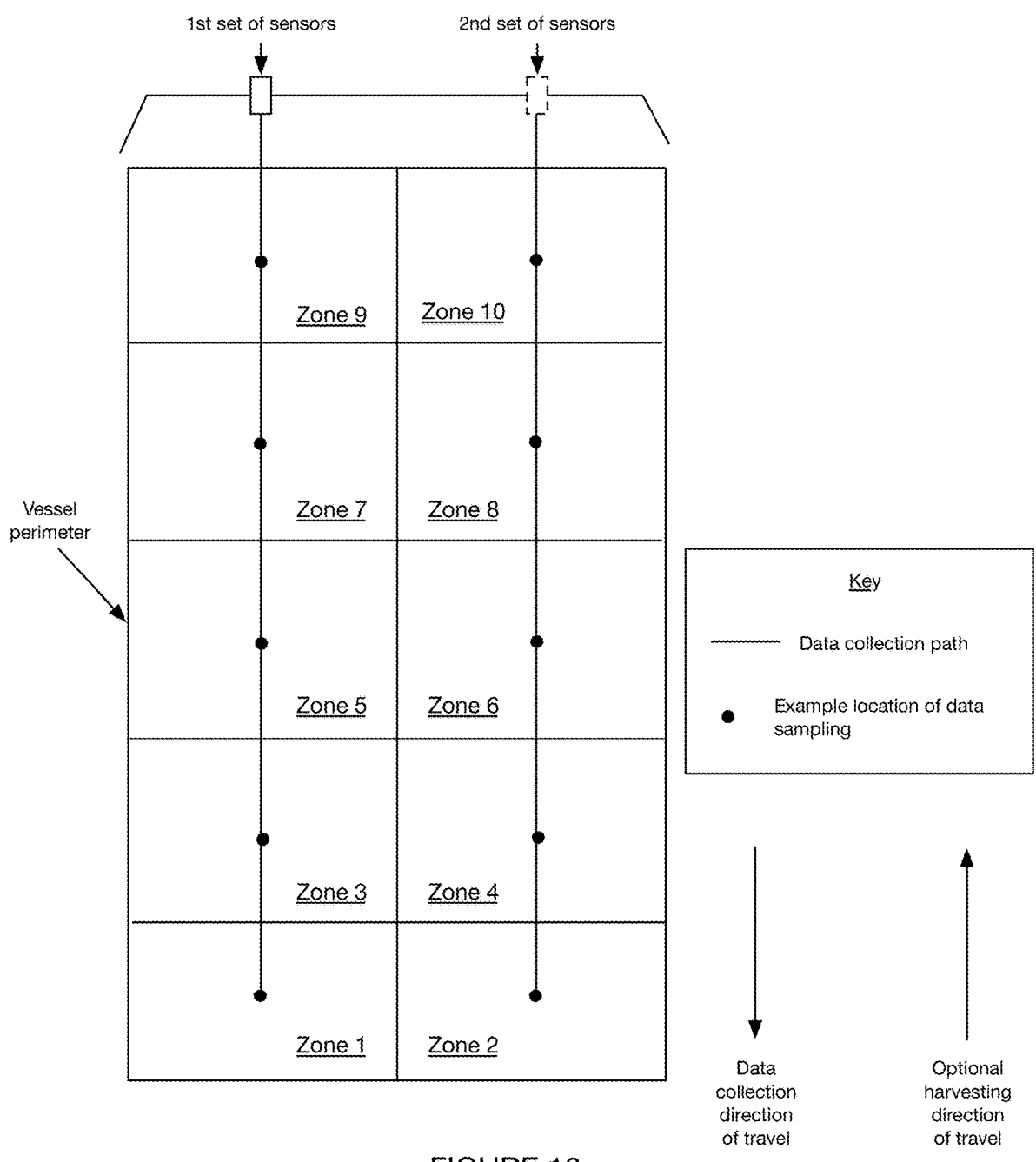
FIG. 16 depicts an example of a data collection trajectory.

The set of sensors further preferably includes location sensors (e.g., Global Positioning Satellite [GPS] sensors), which function to determine a location (e.g., position) of one or more components relative to the vessel and/or assist control subsystems of the robot(s). In variants, for instance, the location of each harvesting robot is determined relative to the vessel based on GPS data. In examples, the location of the harvesting robot is used to move the nozzle to, between, and within each of the cells of the vessel. In a particular implementation, for instance, the harvesting robot is moved to a center of each cell to take an image (e.g., single image) of the region (e.g., as shown in FIG. 16) correlated with its position, wherein this image is processed to determine whether or not that region should be harvested. The detected location of the nozzle can further be used to implement harvest patterns of varying shapes within each region. In a particular specific example, GPS and encoder sensor fusion can be performed to enable accurate position of the harvester relative to the vessel and/or detected plant material.

The set of sensors can optionally include any number of supplementary sensors, such as, but not limited to: temperature sensors, humidity sensors, nutrient (e.g., phosphate, potassium, nitrogen, nitrate, nitrite, ammonium, etc.) sensors, pH sensors, other culturing parameter sensors, light/optical sensors, conductivity sensors (e.g., electrical conductivity sensors), dissolved oxygen sensors, plant health sensors (e.g., fluorescence sensor, camera, morphology sensors, etc.), motion sensors (e.g., to detect a foreign object entering the harvesting region), height sensors (e.g., to control a height of the nozzle relative to the water's surface, to determine a distance of the nozzle relative to the water, etc.), and/or any other sensors.

In some variations, these supplementary sensors can be used to determine and/or adjust (e.g., normalize) any or all of the metrics described below. Additionally or alternatively, any or all of the harvesting parameters can be determined based on supplementary sensor information, one or more processes of the method 200 and/or actions can be triggered based on supplementary sensor information, supplementary sensor information (e.g., mass of collected material with mass or weight-based sensors such as scales, volumetric flow rate sensors, other downstream sensors, etc.) can be used to train and/or update models (e.g., harvesting models); and/or the supplementary sensor information can be otherwise suitably used.

The set of sensors can be configured to take measurements at any suitable locations relative to the harvesting region, such as: above the harvesting region (e.g., to image a surface of the harvesting region, to image and/or sample measurements of plants at a surface of a pond, etc.); within the harvesting region (e.g., within media of an aquatic harvesting region); outside of the harvesting region (e.g., offboard the harvesting region); and/or at any other locations.

Figures 4A, 4B, 4C:
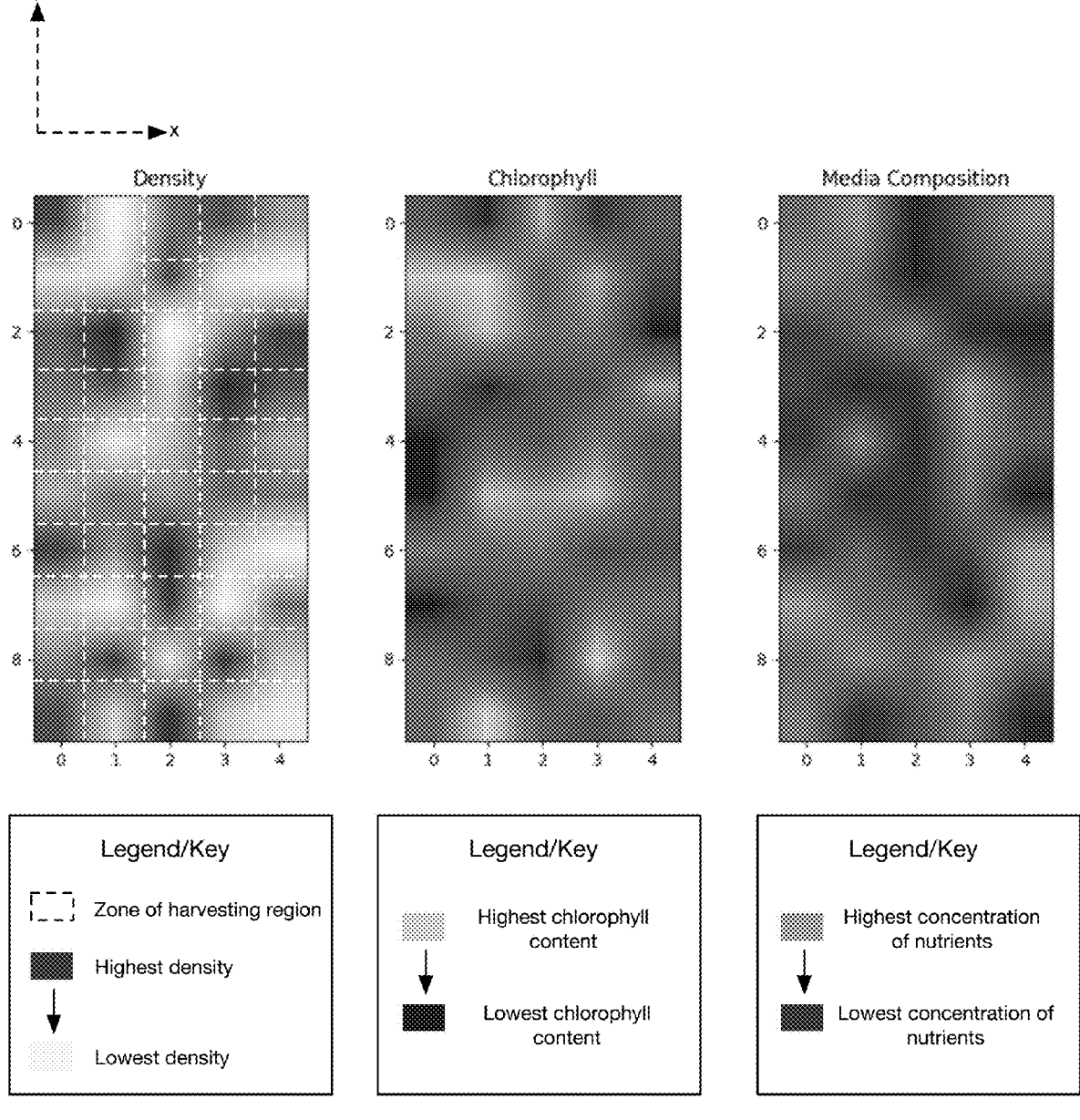
FIGS. 4A-4C depict schematic variations of an assessment of a harvesting region.

In preferred variations, at least a portion of the set of sensors is preferably mobile relative to the harvesting region, such that the sensors can take measurements at multiple locations relative to the harvesting region (e.g., to determine a set of heat maps as shown in FIGS. 4A-4C), such as at a set of multiple zones (e.g., as shown in FIG. 4A) of a surface of the harvesting region, within the harvesting region, and/or any other zones. The mobile sensors can be any or all of (e.g., as shown in FIG. 6A): coupled to (e.g., attached to, fixed to, etc.) a nozzle and/or nozzle assembly, coupled to a transport subsystem, coupled to a cart or other mobile component of the harvesting subsystem (e.g., cart as shown in FIG. 9, mobile rail as shown in FIG. 10), coupled to a static part of the harvesting subsystem (e.g., with multiple versions of each sensor spaced out), offboard the harvesting subsystem and/or harvesting region (e.g., coupled to an aerial robot such as a drone as shown in FIG. 11), within the harvesting region (e.g., to measure the temperature of liquid within the pond), and/or at any other locations or combination of locations.

In a set of specific examples, a set of cameras (and/or other optical sensors) and optionally one or more ultrasonic sensors or other sensors move with the nozzle assembly (e.g., are coupled to the nozzle assembly, are coupled to the transport subsystem, etc.). In a particular specific example, any or all of these sensors are located upstream of the nozzle (e.g., as shown in FIG. 6A), such that any or all harvesting parameters (e.g., duration for which nozzle stays at a single location, flow rate of nozzle, speed of nozzle movement, etc.) can be dynamically determined based on the sensor measurements sampled at the upstream sensors.

The system 100 can optionally include one or more computing subsystems (e.g., computers, local computer, remote computer, etc.) and/or processing subsystems (e.g., processors), can function to: process the sensor information, calculate metrics, perform assessments, operate any or all of the components, build a historical database of past and present information, consult a historical database for decision-making, and/or perform any other functions. Computers and/or processors of the computing subsystem can be any or all of: located onboard the harvesting subsystem, located on a transport subsystem (e.g., rail carts, rails, etc.), located offboard the system, located remotely (e.g., cloud-based computing subsystem, with a cloud computing connection as part of the system, etc.), located at any other locations, and/or distributed among multiple locations.

In a preferred set of variants, the computing subsystem is configured to process any or all of the sensor data collected above, determine a set of metrics (e.g., density metric, plant health metric, etc.) based on the sensor data, and evaluate and/or implement a set of path planning algorithms and/or models in order to determine and/or initiate harvesting in S500. In a set of examples, for instance, the computing subsystem is configured to determine and transmit a set of control commands for implementation at the harvesting subsystem and/or any other actuatable components (e.g., rail transport subsystem) of the system, wherein the set of control commands are configured to implement a harvesting protocol (e.g., in S500).

Additionally or alternatively, the system 100 can include any other components (e.g., set of controllers).

In a preferred variant of the system (e.g., as shown in FIG. 8), the system includes: 2 robotic carts with nozzles, where the 2 robotic carts move along a rail; a set of wheeled carts that move the rail along a length of the vessel; a flexible impeller pump and/or vacuum; floating gate weir nozzles; computer vision (CV) cameras for performing data collection and making harvesting decisions; one or more hoppers to collect harvested material; computing and/or processing subsystems (e.g., onboard the harvesting subsystem, in communication with the harvesting subsystem, etc.) to perform analysis of the sensor data and/or determine harvesting patterns; and/or any other components.

4. Method 200

As shown in FIG. 2, a method 200 for computer-assisted harvesting can include any or all of: sampling a set of sensors S100; determining a set of metrics associated with a harvesting region S200; and assessing the harvesting region S400. Additionally or alternatively, the method 200 can include any or all of: aggregating the set of metrics S300; triggering an action S500; post-processing harvested materials; learning from a prior harvest; and/or any or all of the processes as described in U.S. application Ser. No. 17/110, 244, filed 2 Dec. 2020, which is incorporated in its entirety by this reference, or any other suitable processes performed in any suitable order.

The method 200 is preferably performed with a system 100 as described above, but can additionally or alternatively be performed with any other suitable system.

The method 200 preferably functions to optimize any or all of the harvesting process (e.g., amount of material harvested, quality of material harvested, etc.) associated with the harvesting of plants in a harvesting region, such as through any or all: optimizing temporal parameters (e.g., frequency, duration, speed, etc.) associated with harvesting; optimizing parameters associated with harvesting (e.g., nozzle flow rates, the 2D shape of a harvesting trajectory, etc.) and/or data collection (e.g., the 2D shape of a data collection trajectory); optimizing environmental conditions associated with the plants (e.g., detecting foreign objects, maintaining media, preventing algae growth, preventing plant decay and/or destruction, etc.); optimizing the location(s) of harvesting and/or data collection and/or other actions; maintaining a uniform density of the plants; and/or otherwise optimizing harvesting. Additionally or alternatively, the method 200 can function to optimize any other processes associated with maintaining plants and/or a harvest region (e.g., as described above).

4.1 Method—Sampling a Set of Sensors S100

The method 200 can include sampling a set of sensors S100, which functions to receive information with which to assess the harvesting region and optimize one or more processes (e.g., harvesting, maintenance, etc.) associated with the plants of the harvesting region. Additionally or alternatively, S100 can function to collect information in ways which are non-destructive and/or non-interfering to the plants, and/or otherwise suitably collect information associated with the plants, their environment, and/or any other features.

S100 is preferably performed initially during the method 200 (e.g., before part or all of a harvesting session), but can additionally or alternatively be performed at any or all of: multiple times (e.g., continuously, at a predetermined frequency, at a random set of intervals, etc.) during the method 200; in response to another process of the method 200; during (e.g., simultaneously with, overlapping with, at least partially overlapping, etc.) another process of the method 200 (e.g., during S400, during S500, etc.); and/or at any other times during the method 200. Further additionally or alternatively, any or all of S100 can be performed in response to a trigger, such as in response to any or all of the sensor information collected in S100. For instance, measurements at an ultrasonic sensor can be triggered in response to detecting that the vision of one or more cameras is saturated.

S100 can optionally include moving any or all of the set of sensors (e.g., during all of S100, during a part of S100, etc.), which can function to sample data across a surface area of and/or within (e.g., at varying depths within) the vessel, such as at various zones within the vessel. In some uses, for instance, the optical sensors (and/or ultrasonic sensors) are moved to various locations during S100 (e.g., through movement of the harvesting robot, through movement of carts, through movement of the system along carts and/or rails, through use of a drone, etc.), where the data is collected at any or all of these various locations. Location sensors (e.g., GPS sensors) can optionally be used to inform this movement and/or where and when the data is sampled. For instance, in some variants, location sensors are used to move other sensors (e.g., cameras) to a predetermined location or locations in each region (e.g., center, edge, corner, etc.) such that images (or other data types) can be consistently sampled and compared (e.g., with each other, with historical data, etc.). The path of movement of the sensors is referred to herein as a data collection trajectory.

Additionally or alternatively, sensor data can be sampled at a single location (e.g., without movement), continuously (e.g., during movement, while sensors are non-stationary during data collection), and/or in any other suitable ways.

In a first variation (e.g., operation mode) of S100, any or all of the sensors can be utilized (e.g., positioned) as upstream sensors (e.g., located ahead of the nozzle, as shown in FIG. 6A, located ahead of any or all of the harvesting subsystem, etc.) during traversal of the nozzle, such that the sensor information collected in S100 can dynamically (e.g., in real time, in substantially real time, prior to the nozzle reaching the sampled plant region, etc.) inform (e.g., select, determine, etc.) operation of the nozzle.

In a set of examples, depending on the direction of travel, the sensors can be used as upstream sensors to determine which regions to harvest as they travel down the vessel, and then function as downstream sensors when the nozzles go back up the vessel, enabling use in capturing a post-harvest image (and/or other post-harvest sensor data) for each region.

In another set of examples, sensors can be placed on/utilized on both sides of the nozzle (e.g., such that there are always upstream and downstream sensors).

In a second variation (e.g., operation mode) of S100, the sensing process can be performed independently of (e.g., non-overlapping, non-simultaneously, prior to, asynchronously with, etc.) the harvesting process.

For instance, data can be collected in a first process (e.g., in a first pass of the harvesting robots along the vessel), and the vessel can be harvested in a second process subsequent to the first. In a set of examples, for instance, the sensors can execute a data collection trajectory to image the vessel in its entirety, where this data is processed (e.g., in S200) and used to subsequently execute a harvest trajectory. In a specific example, the sensors can travel down the vessel, imaging each of the set of regions (e.g., at a center point of each region), and then based on the data, harvest the vessel as it travels back up the vessel.

In a third variation, sensors can be positioned both upstream and downstream of the nozzle, in line with the nozzle (e.g., having a same central axis), movable independent of the nozzle, and/or otherwise suitably arranged.

Additionally or alternatively, the sensing process can be performed at any other times and/or at any combination of times (e.g., the vessel can be fully scanned and then harvesting initiated where the entire vessel is harvested; the vessel can be scanned and decisions made on if/how to harvest as the scanning is being performed, where the harvesting is performed before the entire vessel is scanned; etc.).

S100 preferably includes sampling a set of optical sensors (e.g., cameras, photometers, photodiodes, phototransistors, spectroscopy devices, fluorometers, etc.) which can function to determine: a density metric associated with a pond and/or one or more zones within a pond (e.g., plant density, leaf count, etc.), whether or not the optical sensor vision (e.g., camera vision) is saturated (e.g., in order to prompt measurements from the ultrasonic sensor(s)) meaning that the aquatic plant material fully or nearly fully covers an entire surface of the vessel, what the chlorophyll content of the plants is, what surface area of the harvesting region the plants are covering, which areas of the harvesting region are absent of plant growth, whether or not a foreign object (e.g., animal, other plant species, inanimate object, etc.) has entered the harvesting region, and/or any other information.

Figure 14A:
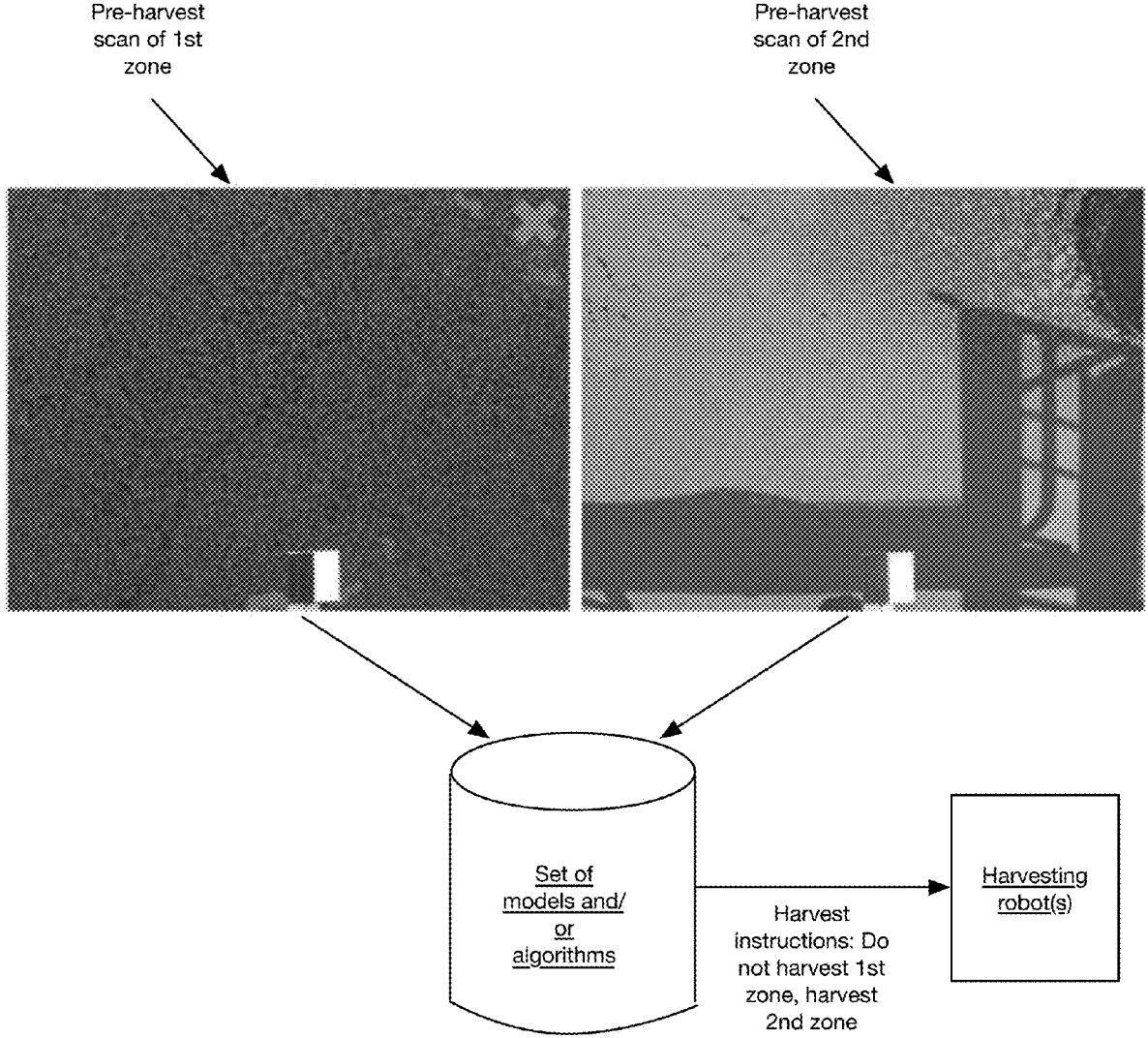
FIGS. 14A-14B depict a set of example scans of zones of a vessel.
Figure 14B:
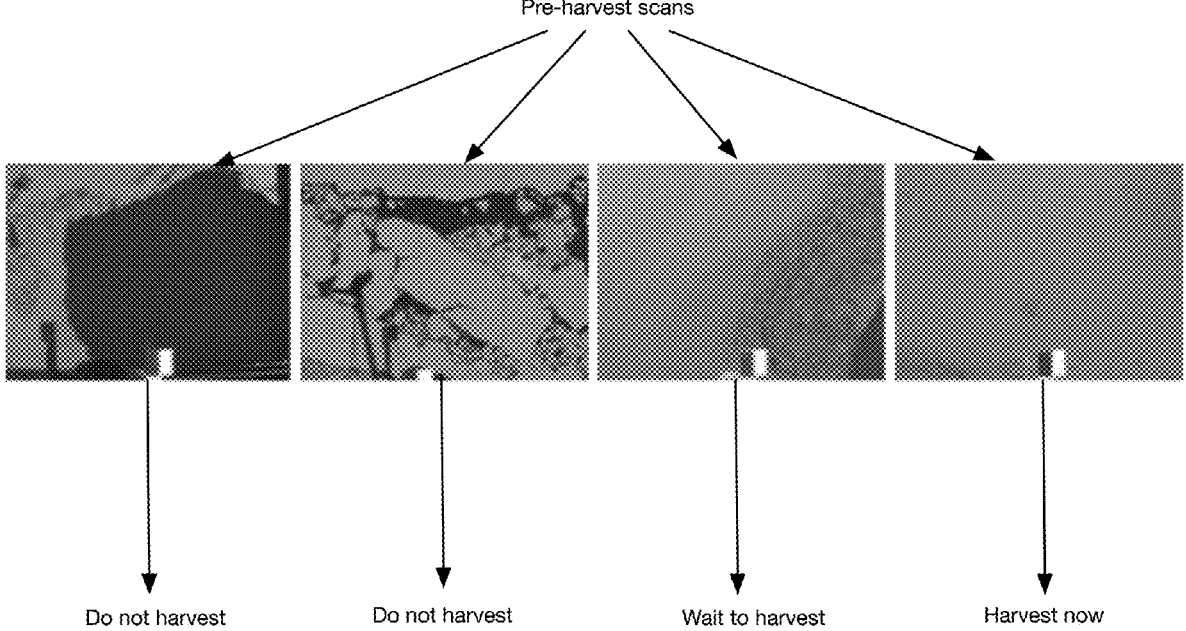

Sampling the optical sensors in a region is preferably at least partially performed prior to harvesting that region, wherein the sampled image (equivalently referred to herein as a pre-harvest image) is used to guide decision making of when and/or how that region should be harvested (e.g., as described below). Examples of pre-harvest images are shown in FIGS. 14A-14B.

S100 further preferably includes collecting location data, which can be used to trigger sampling of other sensors. Additionally or alternatively, the location data can be used to attribute location information to measurements (e.g., for learning and/or training purposes), and/or can be otherwise suitably used (e.g., using location to query weather data for the region rather than measuring it, using location to match with existing satellite data, etc.).

S100 can optionally additionally or alternatively include collecting a set of energy measurements from one or more ultrasonic sensors proximal to the harvesting region (e.g., superior to a surface of aquatic plants in a pond), where the set of energy measurements are further processed in the method 200 to determine a density metric (e.g., biomass density) associated with the plants.

S100 can further additionally or alternatively include collecting measurements from any or all of a set of supplementary sensors as described above.

In some variants, S100 can additionally or alternatively include collecting data during a harvesting process and/or after a harvesting process, which can function to: assess an effectiveness of a harvesting process; predict when a next harvesting process is likely to be needed; schedule a next harvesting process; quantify one or more outcomes (e.g., total mass harvested) of a harvesting process; improve a performance or accuracy of the system and/or method (e.g., through updating or retraining one or more models); and/or perform any other functions.

In a first set of examples, for instance, S100 includes collecting (e.g., in addition to collecting pre-harvest images) a set of post-harvest images of each of a set of regions of the vessel (or the entire vessel) after harvesting has been performed.

In a second set of examples, S100 includes collecting flow rate data (e.g., in addition to collecting vessel surface images) enable the mass and/or volume of harvested plants to be determined. In a specific example (e.g., as shown in FIG. 18), this can be enabled through the use of a transparent tube that the collected plants flow through (e.g., downstream of the nozzle, on a rail, when entering a hopper, etc.), where the collected plants are imaged with one or more cameras (e.g., high-speed cameras). This can be used to: better quantify how much material has been collected; predict in future iterations how much material will be collected (e.g., by correlating the flow rate data with the pre-harvest images, by determining an algorithmic relationship between the flow rate data and pre-harvest images, through the use of a trained model, etc.); enable assessments of plant health to be made (e.g., since high yield regions can correlate with having healthier plants); enable assessments of the growing environments of each region to be made (e.g., by detecting water quality through color, detected materials, or other information); and/or be otherwise used.

Further additionally or alternatively, S100 can include collecting data from non-sensor sources, such as, but not limited to: databases (e.g., historical vessel data, data from other vessels, a historical database to take past performance into account for a new harvesting session, etc.); websites (e.g., weather information); calendars and/or schedules (e.g., inoculation calendar for a vessel, historical harvesting schedules, etc.); and/or any other information.

Additionally or alternatively, S100 can include any other suitable processes.

4.2 Method—Determining a Set of Metrics Associated with a Harvesting Region S200

The method 200 can include determining a set of metrics associated with the harvesting region S200, which functions to process the sensor information in order to assess and optimize harvesting processes. Additionally or alternatively, S200 can function to determine information with which to perform and/or optimize any other processes.

S200 is preferably performed in response to and based on S100, but can additionally or alternatively be performed multiple times (e.g., continuously, at a predetermined frequency, etc.), in response to another process of the method 200, during (e.g., simultaneously with, in parallel with, at least partially overlapping with, etc.) another process of the method 200, and/or at any other times.

S200 can be performed for: each zone, the whole pond, multiple ponds, and/or any other region.

The metrics are preferably used to inform any or all of: which regions (e.g., zones) of the pond are harvested, when the regions of the pond are harvested, the harvesting pattern (e.g., path) implemented in the zone, harvesting parameters associated with collection of the aquatic plant material (e.g., speed of harvesting, speed of movement of harvesting subsystem, flow rate of nozzle, diameter of nozzle, height of nozzle, etc.), and/or any other actions in S500.

Determining the set of metrics is preferably performed at a computing and/or processing subsystem, and can optionally include evaluating any or all of: a set of equations, a set of algorithms, a set of models (e.g., trained models, machine learning models, deep learning models, etc.), performing a set of computer vision processes (e.g., to detect a foreign object), any combination, and/or any other tools.

The set of metrics preferably includes a coverage metric (equivalently referred to herein as a density metric), which reflects an amount (e.g., total amount, relative amount such as between regions, concentration, etc.) of crop in a pond and/or in sections (equivalently referred to herein as sections and/or cells).

In a set of variants, for instance, S200 includes evaluating one or more trained models (e.g., machine learning model(s), deep learning model(s), computer vision model(s), etc.) configured to distinguish between plant and non-plant material in the pre-harvest image(s), which can be used to determine plant coverage of the region. Additionally or alternatively, plant coverage can be assessed in absence of a trained model or process (e.g., with a manual process, with a rule-based process, etc.), in a combination of ways, and/or in any other suitable way.

In examples, the coverage metric is a plant density metric, such as a plant density in mass per unit area. Additionally or alternatively, the plant density metric can include a volume density, a weight density, and/or any other density.

The density metric is preferably determined based on optical sensor measurements, and optionally one or more of: computer vision processes, a set of algorithms and/or models, and/or any other tools.

Figure 3:
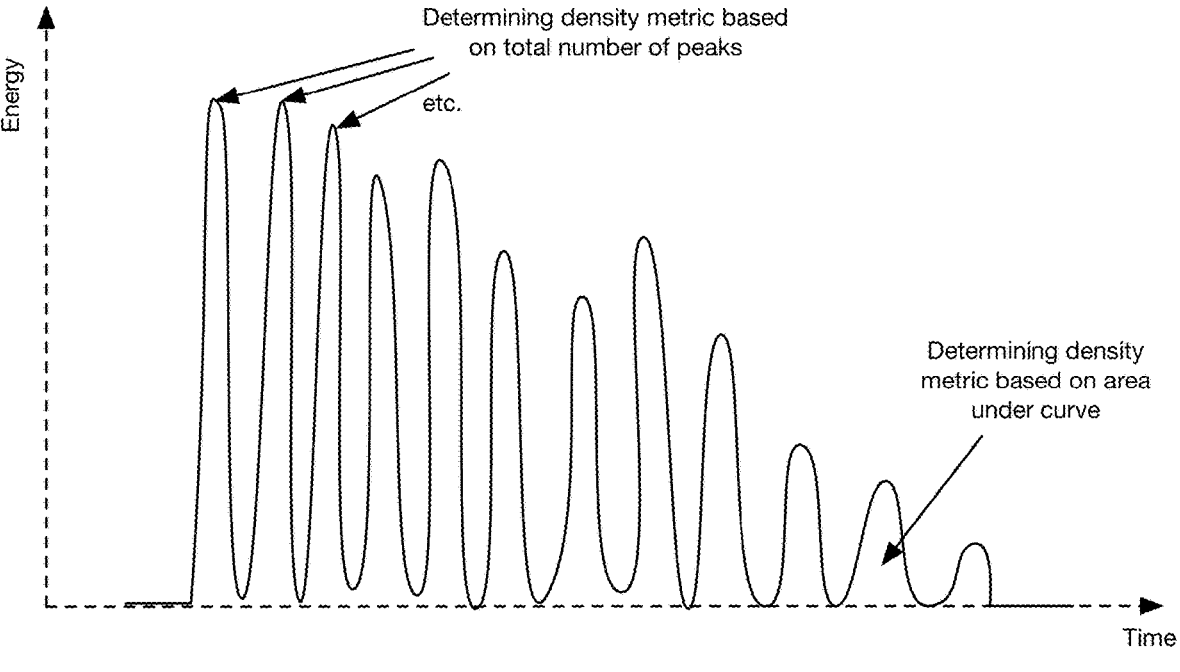
FIG. 3 depicts a schematic variation of a sensor measurement for computer-assisted harvesting.

Additionally or alternatively, the density metric can be determined based on one or more energy measurements (e.g., energy curve) produced by a set of ultrasonic sensors (e.g., as described above), such as an amount of energy returned at the ultrasonic sensors (e.g., the raw ultrasound waveform, an envelope, other measure of energy returned, etc.). A schematic example of an envelope curve of the energy sampled by the ultrasonic sensor is shown in FIG. 3.

In some variants, for instance, the density metric is determined at least in part based at least in part on a magnitude (e.g., amplitude) of energy detected at the ultrasonic sensor. In variations involving an energy curve (e.g., as shown in FIG. 3) and/or multiple energy curves (e.g., multiple measurements taken at a single location, measurements taken at multiple locations, etc.), the density metric can be calculated based on (and/or include) any or all of: an amplitude value of one or more peaks (e.g., all peaks, all peaks above a predetermined energy threshold, a predetermined number of peaks, etc.); an area (and/or any other integral) under any or all of the energy curve; a power calculated based on the energy measurements (e.g., RMS power); parameters associated with a curve fitted to the energy measurements; and/or any other parameters.

Alternatively, the density metric can be determined solely based on optical sensor measurements, and/or based on any other measurements.

The density metric can optionally be normalized and/or otherwise adjusted based on any or all of the sensor measurements (e.g., supplementary sensor measurements), such as any or all of: air speed, temperature, humidity, light, protein content, nutrient measurement in media, position (e.g., from an IMU), and/or any other measurements.

S200 can optionally include, such as with one or more ultrasonic sensor(s), collecting information with which to determine a height and/or height difference associated with a harvesting region, such as a pond. In some variations, for instance, upon detecting that a pond or other harvesting region is not level, the detected height difference can be used to determine and/or adjust any or all of the harvesting parameters or other operational parameters of the harvesting subsystem.

The set of metrics can additionally or alternatively include any other metrics associated with the plant health, plant composition, harvesting region, and/or other features, such as any or all of: a protein content associated with the plants (e.g., from an NIR sensor); a chlorophyll content associated with the plants; a starch content associated with the plants; a nutrient composition of the media in an aquatic harvesting region; an assessment of the uniformity of the harvesting region (e.g., if certain areas are absent of plant growth); a metric reflecting if a foreign object has entered the harvesting region; and/or any other metrics.

For instance, any or all of the following information can be determined (e.g., with models and/or algorithms, equations, mappings, a lookup table, etc.) and/or be used to inform harvesting in S500: a media condition (e.g., ammonium value, water temperature, pH, electrical conductivity) associated with the pond (e.g., determined hourly, daily, multiple times per day, etc.); media composition values (e.g., nitrogen level, phosphorus level, potassium level, pH value, conductivity value, etc.) (e.g., determined hourly); plant condition metrics (e.g., chlorophyll, density, etc.) (e.g., determined during harvesting session, determined at a predetermined frequency [e.g., between every second and every minute] during harvesting, etc.); weather metrics (e.g., wind vector, humidity, air temperature, etc.) (e.g., determined based on $3^{rd}$ party weather data, collected at a predetermined frequency, etc.); parameters from the previously harvested batch of aquatic plant material (e.g., weight of batch, crude protein level, percent of solids collected, etc.); system component metrics (e.g., nozzle health and/or operational parameters, pump health and/or operational parameters, etc.); pond metrics (e.g., water level); and/or any other metrics or combination of metrics.

Relative to harvesting, the metrics can be any or all of: dynamically determined (e.g., during harvesting), previously determined (e.g., prior to a harvesting session, during a previous harvesting session, based on historical data, etc.), predicted, determined at a combination of time points, and/or otherwise suitably determined.

In some variants, for instance, a lookahead harvesting process can be implemented in which each row and/or zone of the pond is scanned (e.g., surveyed with optical sensors, surveyed with other sensors, etc.) prior to harvesting. In other variants, a current zone can be dynamically scanned while harvesting is taking place. In yet other variants, the whole pond can be scanned and then harvested.

Additionally or alternatively, S200 can determine any other metrics and/or perform any other processes.

4.3 Method—Aggregating the Set of Metrics S300

The method 200 can optionally include aggregating the set of metrics S300, which can function to assess a harvesting region in whole, assess multiple harvesting regions together, determine aggregated metrics with which to assess the harvesting region in S400, determine and/or learn from trends associated with a harvesting region over time, form a database of aggregated information which can be referenced and/or learned with, and/or can perform any other functions.

S300 can optionally be performed in response to S200 (e.g., based on the metrics determined in S200). Additionally or alternatively, S300 can be performed in response to a completion of the method 200, in response to the performance of multiple iterations of the method (e.g., for a single harvesting region, for multiple harvesting regions, etc.), and/or at any other times.

Aggregating metrics can include, for instance, any or all of: aggregating metrics of the same type (e.g., within a zone of a harvesting region, over multiple zones of a harvesting region, over time, from multiple time points, to determine a time history and/or historical trends associated with a particular harvesting region, to determine historical trends associated with multiple harvesting regions, etc.); aggregating metrics of different types (e.g., to determine an overall health of a harvesting region such as based on chlorophyll content, protein content, and harvesting region uniformity); aggregating metrics from the same harvesting region; aggregating metrics from multiple harvesting regions; and/or aggregating any other metrics and/or combination of metrics.

Additionally or alternatively, any or all of the data received in S100 can be aggregated (e.g., and used in determining one or more metrics).

Figure 5:
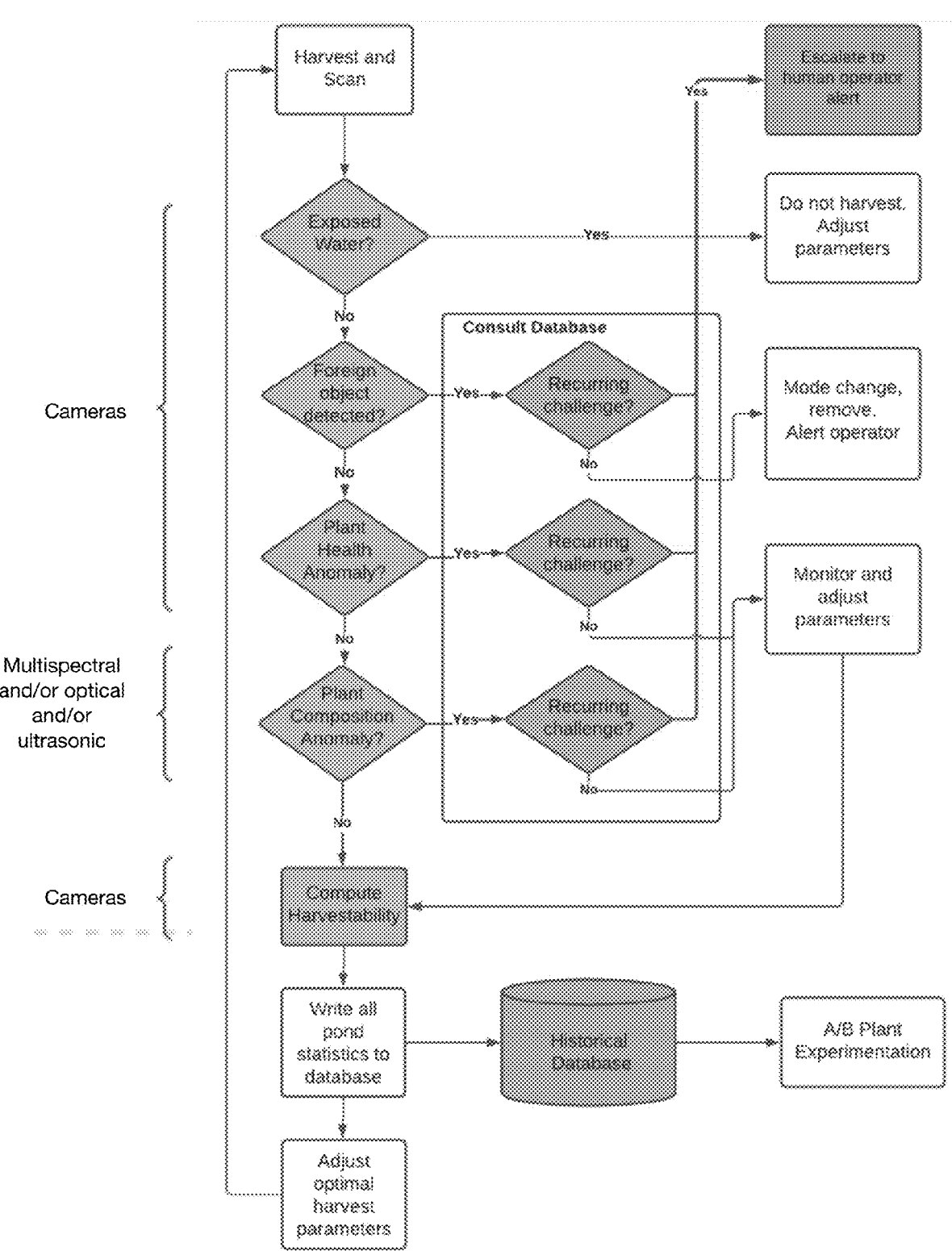
FIG. 5 depicts a schematic variation of a decision tree for monitoring a harvesting region.

The aggregated metrics can optionally be used for any or all of: creating, training and/or updating (e.g., retraining, calibrating, online calibrating, training based on live weight measurements collected during harvesting, etc.) a model (e.g., trained model, machine learning model, deep learning model, regression model, etc.) and/or algorithm; forming a database (e.g., as shown in FIG. 5, for a single harvesting region, for multiple harvesting regions, etc.), which can optionally be referenced (e.g., by a user, computing and/or processing subsystem, etc.) to inform and/or determine (e.g., automatically determine, partially automatically determine, manually determine, etc.) one or more harvesting or other operational parameters; determining an appropriate action to trigger and/or a timing associated with the action (e.g., as described below); and/or for any other suitable purposes.

These can function to enable any or all of: information sharing (e.g., among harvesting regions, among users, etc.); the automation and/or increasing automation of operating a harvesting subsystem, and/or any other functions.

Additionally or alternatively, S300 can include any other suitable processes.

4.4 Method—Assessing the Harvesting Region S400

The method 200 can include assessing the harvesting region, which functions to determine and/or initiate the triggering of an action in S500. Additionally or alternatively, S400 can function to detect an issue and/or irregularity associated with the harvesting region; prevent the need for human intervention in maintaining the harvesting region; and/or perform any other functions.

S400 is preferably performed in response to and based on the determination of a set of metrics in S200 and/or any or all of a set of aggregated metrics determined in S300, but can additionally or alternatively be performed on data (e.g., raw sensor data) collected in S100; multiple times during the method 200 and/or lifecycle of the harvesting region (e.g., at a predetermined frequency, at a random set of intervals, according to a predetermined schedule, according to a dynamically determined schedule, according to a previously determined set of metrics associated with the harvesting region, according to a database and/or model, etc.); and/or at any other time(s).

Assessing the harvesting region can include any or all of: processing any or all of the metrics with a set of models (e.g., trained models, machine learning models, deep learning models, regression models, etc.); processing any or all of the set of metrics with a set of algorithms; referencing (e.g., automatically referencing) a set of databases (e.g., to determine if any or all of the metrics have changed) and/or decision trees; comparing any or all of the set of metrics with a set of thresholds (e.g., predetermined thresholds, dynamically determined thresholds, etc.); and/or any other processes.

Assessing the harvesting region can, but is not limited to, making any or all of the following determinations (e.g., as further described below): whether or not the harvesting region (and/or a zone within the harvesting region) is ready (e.g., optimally ready) to be harvested (e.g., based on the density metric exceeding a predetermined threshold, based on the density metric exceeding dynamically determined threshold, etc.); what harvesting parameters to be implemented when harvesting the harvesting region and/or zone of the harvesting region; how healthy the plants are (e.g., based on comparing a chlorophyll content with one or more thresholds, based on comparing a protein content with one or more thresholds, based on comparing a composition of the harvesting region with one or more thresholds, based on detecting a change in any or all of these metrics, etc.); whether or not and/or to what extent algae is present and may need to be treated (e.g., killed through pumps, microbes, sludge removal, chemicals, ultrasonic algae killers, through a treatment of a zone as indicated in FIG. 17, etc.); whether or not a foreign object has entered the harvesting region; what type of foreign object has entered the harvesting region and/or whether or not it is likely to leave and/or how long it has been present for (e.g., such that a batch collected in the same region as the foreign object can be tagged and optionally further processed); and/or any other determinations.

In a set of variations, S400 includes detecting that a ratio of plant material to non-plant material has reached or exceeded a predetermined threshold (e.g., 0.4, 0.5, 0.6, 0.7, 0.8, 0.9, 0.91, 0.92, 0.93, 0.94, 0.95, 0.96, 0.97, 0.98, 0.99, in a range between any of these values, etc.), which can subsequently be used to trigger a harvesting session in S500. Additionally or alternatively, different ranges of values can correspond to different and/or modified harvesting parameters. For instance, if the ratio is above a first threshold but below a second threshold, a light harvest can be initiated, where the light harvest is categorized by a certain set of harvesting parameters (e.g., harvesting robot speed above a predetermined threshold, harvesting trajectory having a number of passes [a.k.a. switchbacks] below a predetermined threshold, pump speed below a predetermined threshold, etc.).

In a set of variations, for instance, S400 includes detecting that a density of plants in the harvesting region has exceeded a predetermined threshold (e.g., 1000 $g/cm^2$, 900 $g/cm^2$, 700 $g/cm^2$, 600 $g/cm^2$, 1100 $g/cm^2$, 1200 $g/cm^2$, between 800 and 1200 $g/cm^2$, any ranges between these values, etc.), which can be subsequently used to trigger a harvesting session in S500. The density can be determined (e.g., deduced, with an algorithm, etc.) based on a ratio (e.g., as described above), in absence of other metrics, and/or in any other ways.

In other variations, any other metrics (e.g., flow rates, plant health, plant distribution across a region, etc.) can be determined.

S400 preferably includes determining if the vessel and optionally which zones within the vessel are ready to be harvested. In a specific example shown in FIG. 12B, for instance, it is determined, based on a coverage/density metric, that Zone 7 is not ready to be harvested, and that only part of Zone 4 is ready to be harvested. In a specific example shown in FIG. 13B, it is determined, based on the density metric, that Zone 6 is not ready to be harvested.

S400 can additionally or alternatively include determining a level (e.g., intensity, category, degree, etc.) of harvesting to be applied to a vessel and/or each zone within a vessel, which can be used to inform: a timing of harvesting (e.g., harvest now, harvest later, etc.) that zone; a frequency of harvesting that zone; a pattern of harvesting to be used for that zone; and/or any other features of harvesting.

The level of harvesting can be determined from: a discrete number of categories (e.g., harvest, do not harvest, harvest lightly, harvest heavily, harvest if there is time, either harvest now or at the next opportunity, do not harvest but check the zone again at some time in the future, etc.); a spectrum of values (e.g., wherein the rating is used to select or corresponds to parameter values [e.g., nozzle speed, pump rate, etc.] of operation of the harvesting robot); or any combination of value types.

In some examples, for instance, a category of harvesting readiness can be applied to each zone, which include: harvest now, potentially harvest now, harvest later, and do not harvest, and/or optionally others. In the event that a "potentially harvest now" and/or "harvest later" determination is made, a weighted historical value can optionally be attributed to the zone to track its progress and inform a timing at which it actually gets harvested (e.g., once a plant coverage ratio increases between scans, once a growth rate over time reaches a certain value, etc.).

In other examples, harvesting readiness can be attributed to multiple zones, an entire vessel, and/or any other region(s).

In yet other examples, day-to-day changes (or changes at other time scales) can be made to the harvesting pattern (e.g., shape, dimensions, etc.) to optimize plant health. In specific examples, different edges of the vessel can be traversed each day to promote plant health and/or growth.

S400 can additionally or alternatively include selecting (e.g., from a predetermined list) and/or generating (e.g., dynamically, based on the pre-harvest image, etc.) a harvesting trajectory for one or more zones (e.g., each of those that will be harvested in the given harvesting session). The harvesting trajectory preferably prescribes at least a shape of the nozzle path through the zone, but can additionally or alternative prescribe nozzle operational features (e.g., speed of nozzle movement, height/depth of nozzle relative to vessel surface, etc.), pump operational features (e.g., pump speed, flow rate of collected materials, etc.), other features of the harvesting robot (e.g., power output, position relative to the vessel, etc.), and/or any other features.

The harvesting trajectory can be configured for any or all of: achieving a particular mass or volume of collected material; achieving a particular speed of material removal; minimizing damage to the collected material; avoidance of particular sub-regions; contact with particular sub-regions; mixing of vessel contents; and/or any other objectives.

For instance, the inventors have discovered that changing the harvest shape can be used to change the amount of time that the nozzle is in the water collecting plants, which in turn affects the amount of plants that are collected. Additionally or alternatively, the adjustment of other parameters (e.g., nozzle speed, pump speed, etc.) can influence (e.g., change) these and/or other outcomes as well.

The shape of the harvesting trajectory can affect or determine any or all of: how much plant material is collected, how long it takes to harvest the zone, which sub-regions of a zone are harvested or harvested most thoroughly (e.g., to spend efforts harvesting the highest density areas), which sub-regions of a zone to minimally harvest or leave untouched (e.g., to avoid harvesting over "holes" in the plant coverage), a uniformity of how materials are collected over a surface of the zone, and/or any other outcomes.

A shape can be defined by, but is not limited to, any or all of: a number of passes across a width of the zone (e.g., 2 for Trajectories 1 and 2 in FIG. 15; 3 for Trajectories 3, 4, and 5 in FIG. 15; 4 for Trajectory 6 in FIG. 15); a number of segments defining the trajectory (e.g., 3 for Trajectory 2 in FIG. 15); an orientation of segments in the trajectory (e.g., orthogonal segments in Trajectories 2 and 5 in FIG. 15; sloped/angled/non-orthogonal segments in Trajectories 1, 4, and 6 in FIG. 15; etc.); a curvature of the path (e.g., radius of curvature); a straightness of the path; an angle between adjacent segments of the path; a proximity of the path to features of the zone (e.g., corners, edges, etc.); and/or any other shape features.

In some examples, for instance, a harvesting trajectory can be shaped to avoid certain portions of a zone, such as areas with low or no plant coverage (e.g., to minimize how much fluid is collected by the nozzle), areas with a foreign object, and/or any other regions. Alternatively, it can be shaped to target such areas (e.g., since harvesting in a less dense region can pull plants toward that region thereby improving distribution).

Harvesting trajectory shapes can be associated with the same parameters (e.g., nozzle speed, pump flow rate, etc.) relative to each other; different parameters relative to each other; different parameters within a trajectory (e.g., depending on the density distribution of the zone); different parameters for different zones (e.g., enabling zones to be harvested differently even with using the same trajectory shape); and/or otherwise defined.

In some examples, for instance, in an event in which zones are harvested with the same trajectory shape (e.g., due to multiple nozzles being constrained to move together), the trajectories can differ in other parameters (e.g., pump speed to take up more material in one zone over another, nozzle height to be out of the water for a zone that you do not want to harvest, nozzle height to be shallower to remove less plant material, etc.).

Figure 15:
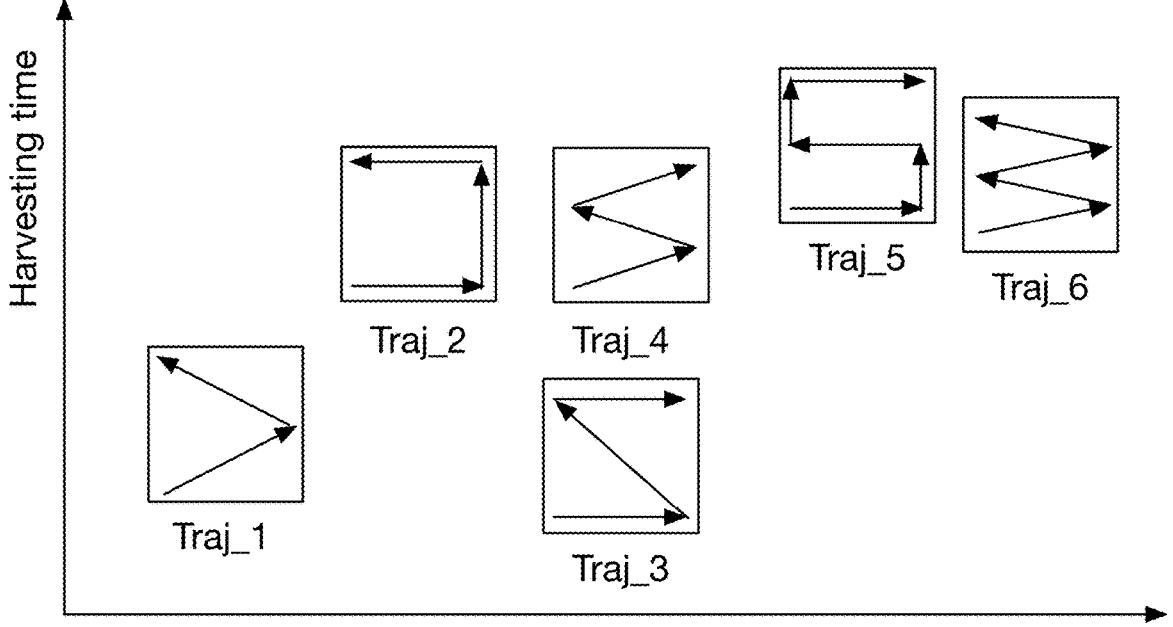
FIG. 15 depicts a set of example harvesting trajectories.

Specific examples of a set of trajectory options are shown in FIG. 15, which demonstrates how a change in trajectory shape can affect how much material is collected, how much harvesting time it takes to implement, a combination of these features, and/or any other features.

Harvesting trajectories can be determined on any or all of: a per-zone basis; a per-vessel basis; a per-harvest basis (e.g., wherein all zones of a vessel are harvested with the same shape); and/or otherwise determined. Harvesting trajectories can be determined with a trained model, selected from a predetermined list, alternated according to a schedule, randomly selected, and/or otherwise utilized. They can be dynamically determined, predetermined, or any combination.

S400 can additionally or alternatively include detecting that a foreign object (and optionally what type) has entered and/or is located within the harvesting region, which can trigger any number of actions (e.g., alerting an operator, removing with a tool and/or process of the harvesting subsystem, delaying a harvesting session, avoiding that zone during harvesting, etc.) in S500.

In another set of variations, S400 includes detecting that a health and/or uniformity of the plants in the harvesting region is below a set of thresholds and/or has declined (e.g., based on historical data associated with the harvesting region, based on a database of information associated with numerous harvesting regions, etc.).

S400 can optionally include initiating termination of the method, such as upon determining that less than a threshold number of zones are ready to be harvested or making any other determinations.

Additionally or alternatively, S400 can include any other suitable processes.

4.5 Method—Triggering an Action S500

The method 200 can include triggering an action, which functions to optimize the operation of the harvesting subsystem and/or optimize the health and conditions associated with the plants in a harvesting region. Additionally or alternatively, S500 can function to optimize the allocation of resources in maintaining a harvesting region (e.g., refraining from wasting resources in harvesting before the plants are ready); enable the sharing of information among users; and/or can perform any other function(s).

S500 is preferably performed in response to and based on one or more assessments performed in S400, but can additionally or alternatively be performed in response to S300 and/or S200 and/or S100; multiple times; in response to a trigger and/or schedule; and/or at any other times and based on any suitable inputs. Additionally or alternatively, any or all of S500 can be performed in parallel with any of the processes described above. In some variations of the method 200, in which the harvesting region is assessed and harvested dynamically, S500 can be performed in parallel with S400.

Figure 13A:
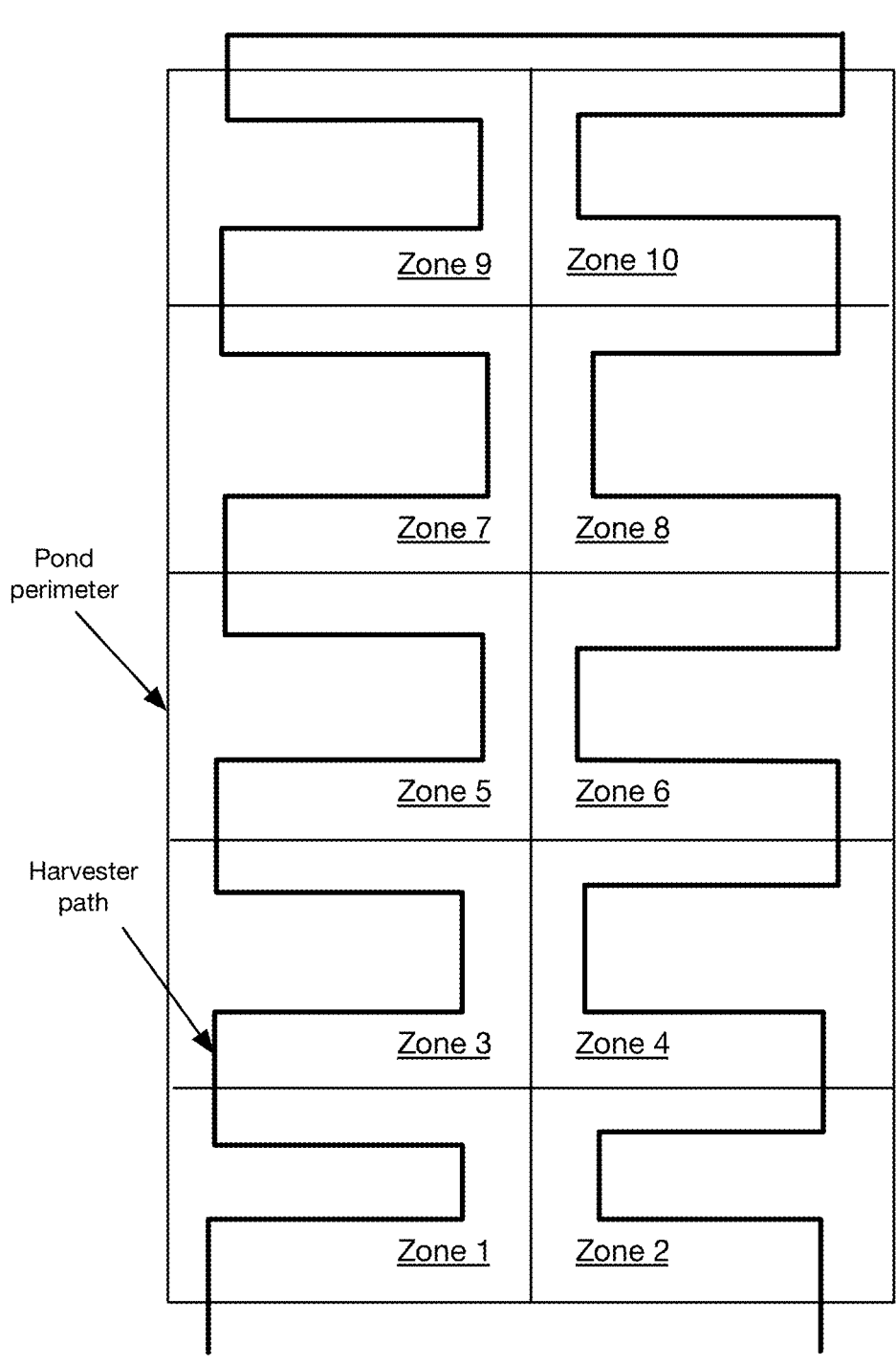
FIGS. 13A-13B depict an example harvesting path through zones of a pond.
Figure 13B:
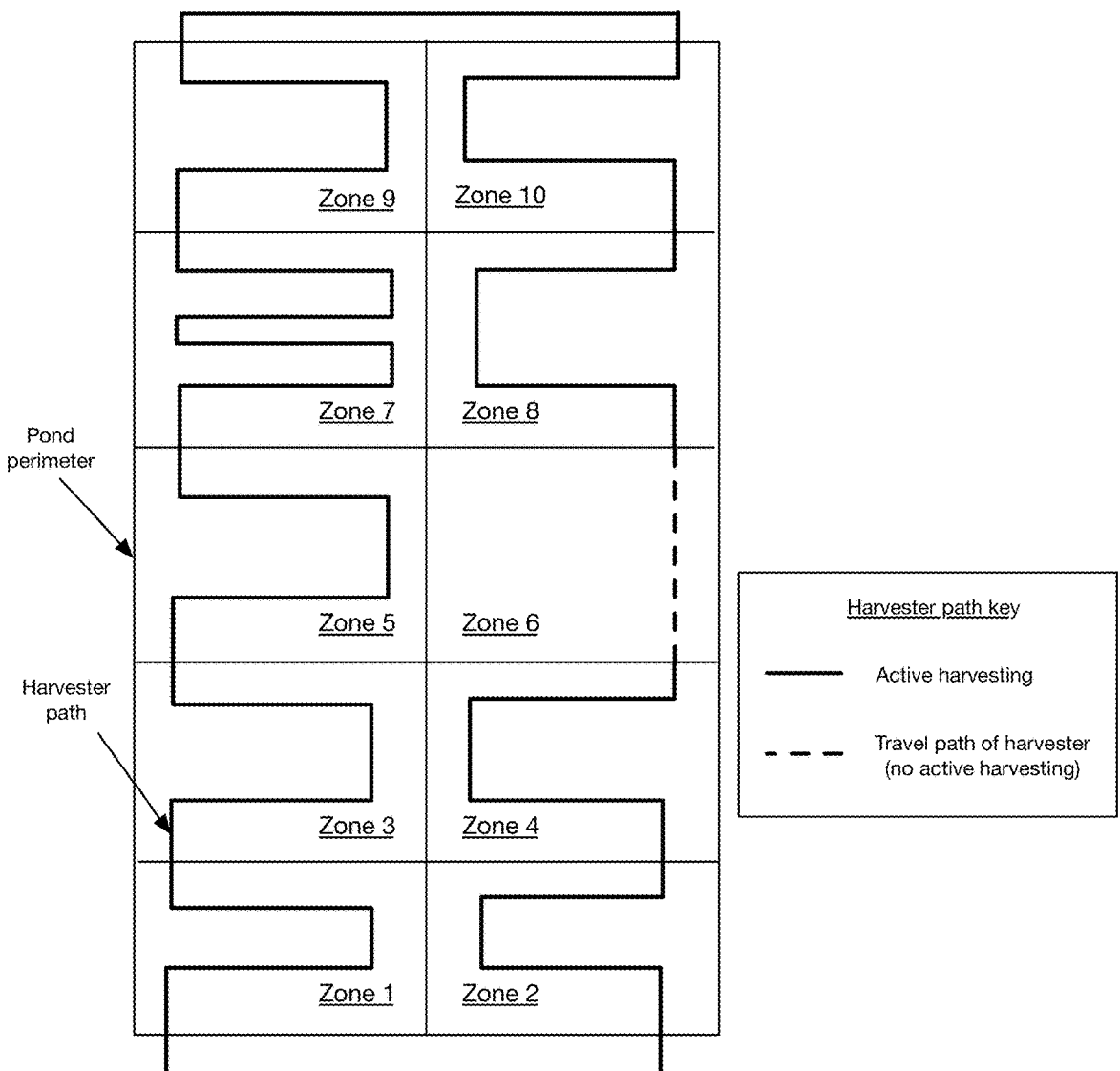

In preferred variations, for instance, the density of plants at different zones (e.g., as shown in FIGS. 9, 10, 11, 12A-12B, and 13A-13B) can be determined and evaluated on a zone-by-zone basis (e.g., in S400) where if the density is above a threshold, those zones are selectively harvested with any suitable harvesting trajectories (e.g., as determined in S400). In specific examples, for zones in which the density is above a second higher threshold, the harvesting parameters can be adjusted such that the harvesting is maximized (e.g., duration of nozzle staying within zone is longer, flow rate of material collection is higher, etc.) relative to other zones. Additionally or alternatively, the harvesting path within that zone and/or parameters associated with harvesting (e.g., speed of harvesting, flow rate of nozzle during harvesting, etc.) can be determined and/or adjusted based on features of plant growth (e.g., density, plant health, leaf count, media health, etc.) within that zone (e.g., as shown in FIG. 12B, as shown in FIG. 13B, etc.).

The zones can be any or all of: physically implemented (e.g., through physical barriers that divide a pond into physically separate regions, through floating walls and/or booms, through walls that extend to a bottom surface of the vessel, through separate vessels, etc.), virtually assigned (e.g., wherein virtual zones are predetermined and/or dynamically determined by the computing subsystem), and/or otherwise implemented.

In one set of variants, the pond includes physical walls that divide the pond into multiple zones, wherein the physical walls (e.g., metal walls) can optionally be detectable by sensors (e.g., laser rangefinders, ultrasonic rangefinders, optical sensors, etc.) of the system such that the harvester can properly harvest based on its location within a zone.

In another set of variants, upon determining that a particular area (e.g., zone) of the harvesting region has no and/or low plant growth, a fertilization of that area can be decreased so as to not promote growth of undesirable organisms (e.g., algae). Alternatively, fertilization of that area or other areas could be increased to purposefully direct plant growth into those areas; one or more components of the harvesting subsystem could move/deposit plants in sparse areas; and/or any other actions could be performed.

The action(s) can be determined based on any or all of: the consulting of a decision tree and/or database (e.g., as shown in FIG. 5), the evaluation of a model and/or algorithm (e.g., trained model, predictive model, etc.), the referencing of a lookup table, and/or with any other processes.

The action triggered in S500 can optionally include the initiation (and/or future scheduling) of a harvesting session, such as in response to detecting that a plant coverage (e.g., density) associated with one or more zones has exceeded a predetermined threshold. Additionally or alternatively, the action(s) can include any or all of: preventing and/or delaying a harvesting of the harvesting region; adjusting a media amount and/or media composition associated with an aquatic harvesting region (e.g., in response to detecting that a level of media has dropped, in response to detecting a zone within the harvesting region that is absent of plants, in response to detecting the presence of a contaminant or unwanted growth, etc.); adjusting a fertilization of a harvesting region; selecting and/or swapping tools of a harvesting subsystem; alerting an operator (e.g., human operator, local operator, teleoperator, etc.); triggering actions initiated by operators; adjusting the pH of the growing regions; triggering pesticide, herbicide, and/or algaecide application; and/or any other actions.

S500 can additionally or alternatively include implementing the harvesting trajectory and its defined operational parameters associated with harvesting or other processes associated with the harvesting region. In some variations, for instance, the density, uniformity, and/or any other metrics/features associated with the harvesting region can be used (e.g., in S400) to determine any or all of: a time until the next harvesting session or other process (e.g., based on aggregated data of how quickly the plants have been growing recently, based on the current density, based on prior densities, based on a predictive model, based on a database of aggregated information, etc.); a speed of harvesting or another process (e.g., speed of nozzle movement, flow rate of a variable flow actuator for collecting materials during harvesting, speed of harvesting cart along rail(s), speed of nozzle along rail(s), speed of rail cart(s) moving along edge of pond, etc.); a location of harvesting or another process (e.g., a subset of zones in FIG. 4A); a shape and/or length of the harvesting path; a nozzle depth; a volume of material harvested; a duration of the harvesting or another process; and/or any other parameters.

In a variation shown in FIG. 18, a data collection path is first traversed in a first primary direction, wherein a primary direction refers herein to a major direction, with the optionality to also travel in other (e.g., orthogonal, opposite, angled, etc.) directions during traversal in the primary direction. For instance, in FIG. 18, the data collection path is traveled going down a length of the vessel, whereas a harvesting path is traversed in a second primary direction opposing the first (e.g., as the sensors and nozzles make their way back up the vessel). Optionally, post-harvest images or other data can be sampled along and/or separate from (e.g., after) the harvesting path. Post-harvest images can, for instance, be used to assess how much material was harvested (e.g., based on correlations with flow rate data) (e.g., per zone), what the growth rate of each zone is, and/or any other metrics.

In a variation shown in FIGS. 12A-12B, a harvesting path shown in FIG. 12A can be adjusted and/or implemented with varying harvesting parameters, as shown in FIG. 12B, based on any or all of the metrics as described above. For instance, determining the harvesting path in FIG. 12B includes: determining, based on a density metric associated with each of Zones 1, 2, 3, 4, 5, 6, 8, 9, and 10, that each of these zones is ready to be harvested (e.g., has a density metric above a predetermined threshold); determining that a portion of Zone 4 does not have a density exceeding the predetermined threshold and truncating the harvesting path within this region to avoid this portion; determining that the density metric associated with Zone 10 exceeds a second, greater predetermined threshold, and that this zone is overgrown; determining which parameters to adjust in response to Zone 10 being overgrown (e.g., harvesting with slower speeds, harvesting with greater flow rates, repeating the harvesting path within Zone 10 one or more times, etc.); and determining that Zone 7 is not ready for harvesting and controlling the harvester to travel through that zone without actively harvesting.

In a variation shown in FIGS. 13A-13B, for instance, a harvesting path shown in FIG. 13A can be adjusted and/or implemented with varying harvesting parameters, as shown in FIG. 13B, based on any or all of the metrics as described above. For instance, determining the harvesting path in FIG. 13B includes: determining, based on a density metric associated with each of Zones 1, 2, 3, 4, 5, 7, 8, 9, and 10, that each of these zones is ready to be harvested (e.g., has a density metric above a predetermined threshold); determining that the density metric associated with Zone 7 exceeds a second, greater predetermined threshold, and that this zone is overgrown; modifying the harvesting path associated with Zone 7 to pass through the zone multiple times; and determining that Zone 6 is not ready for harvesting and controlling the harvester to travel through that zone without actively harvesting.

Additional or alternative actions that can be triggered in S500 can include, but are not limited to: changing environmental conditions (e.g., adjusting a pH) of one or more zones; adjusting one or more schedules (e.g., feeding, harvesting, etc.); providing an alert to an operator or other user (e.g., indicating that a foreign object has been detected); re-inoculating the plants; stirring regions; applying anti-algae measures; adjusting between faster (e.g., harsher) harvesting and slower (e.g., gentler) harvesting types; and/or any other actions.

Additionally or alternatively, S500 can include any other suitable processes.

4.6 Method: Additional Processes

The method 200 can additionally or alternatively include any other processes, such as, but not limited to: post-processing harvested materials; updating a model and/or process based on an iteration of the method 200; and/or any other processes.

In some variants, for instance, the method 200 can include any or all of: training, updating, and/or retraining any or all of a set of models (e.g., machine learning models, deep learning models, neural networks, convolutional neural networks, etc.); analyzing historical data such as scans (e.g., post-harvest images, pre-harvest images, etc.), control parameters of the system, and/or trends among historical data (e.g., to find and propagate patterns in plant performance and/or harvesting performance to improve operations with a vessel and/or multiple vessels [e.g., at the same site, at different sites, etc.]); and/or any other processes.

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

Additional or alternative embodiments implement the above methods and/or processing modules in non-public transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-public transitory computer readable media, or any suitable device. The computer-executable component can include a computing system and/or processing system (e.g., including one or more collocated or distributed, remote or local processors) connected to the non-public transitory computer-readable medium, such as CPUs, GPUs, TPUS, microprocessors, or ASICs, but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A system for the computer-aided harvesting of aquatic crops floating at a surface of a volume of liquid in a vessel, the system comprising:
   a harvesting robot arranged at least partially above the surface, comprising:
      a set of nozzles configured to collect the aquatic crops from the vessel, each of the set of nozzles configured to move relative to the vessel;
      a set of sensors configured to move relative to the vessel, comprising:
         a camera; and
         a location sensor;
   a processing subsystem comprising a set of processors that:
      with the camera, collects a set of images of the aquatic crops;
      processes the set of images to determine a set of plant coverage metrics; and
      produce a harvesting trajectory for the harvesting robot, based on the set of plant coverage metrics, by selecting a shape from a predetermined set of shape options;
   a control subsystem that is coupled to the harvesting robot, the control system comprising a set of actuators driving motion of the harvesting robot, wherein the control system:
      implements the harvesting trajectory.

2. The system of claim 1, wherein the set of nozzles comprises multiple nozzles.

3. The system of claim 1, wherein a height of a nozzle relative to a surface of a fluid volume in the vessel is adjustable.

4. The system of claim 1, wherein at least a portion of the harvesting trajectory is dynamically determined in response to the set of plant coverage metrics.

5. The system of claim 1, wherein collecting the set of images is performed along a data collection trajectory, and the data collection trajectory is separate and distinct from the harvesting trajectory.

6. The system of claim 1, wherein the vessel is divided into a set of distinct zones.

7. The system of claim 6, wherein producing the harvesting trajectory comprises dynamically determining a shape of the harvesting trajectory based on the set of crop coverage metrics.

8. The system of claim 6, wherein producing the harvesting trajectory comprises determining a set of nozzle paths comprising a nozzle path through each of the set of distinct zones.

9. The system of claim 1, wherein the processing subsystem further determines a set of crop coverage metrics comprising a crop coverage metric for each of a set of defined regions of the vessel based on the set of images and produces the harvesting trajectory based on the set of crop coverage metrics.

10. A method for harvesting aquatic crops from a vessel, the method comprising:

with a robot arranged superior to a vessel surface, collecting a set of data associated with a set of regions of the vessel;

processing the set of data to determine a set of plant coverage metrics;

based on the set of plant coverage metrics, determining a shape of a harvesting trajectory by selecting a shape from a predetermined set of shape options; and harvesting the aquatic crops with a nozzle of the robot, comprising moving the nozzle according to the harvesting trajectory.

11. The method of claim 10, further comprising determining a nozzle path for each of the set of regions and constructing the harvesting trajectory based on the set of nozzle paths.

12. The method of claim 10, further comprising determining a set of operational parameters for a pump coupled to the nozzle based on the set of plant coverage metric, wherein harvesting the aquatic crops with the nozzle further comprises operating the pump according to the set of operational parameters.

13. The method of claim 10, wherein collecting the set of data is performed along a data collection trajectory traversed by the nozzle, the data collection trajectory separate and distinct from the harvesting trajectory.

14. The method of claim 10, further comprising: producing an amount value of the aquatic crops after harvesting, the amount value comprising at least one of a mass or volume; collecting a second set of data associated with the set of regions of the vessel; and processing the second set of data to determine a second set of plant coverage metrics, wherein the second set of plant coverage metrics is determined at least in part based on the amount value of the aquatic crops.

15. The method of claim 10, wherein the selected shape is a polyline.

* * * * *